(12) United States Patent
Salem et al.

(10) Patent No.: US 10,700,904 B2
(45) Date of Patent: Jun. 30, 2020

(54) SYSTEMS AND METHODS FOR THE COEXISTENCE OF DIFFERING CYCLIC PREFIX LENGTHS

(71) Applicant: Huawei Technologies Co., Ltd., Shenzhen (CN)

(72) Inventors: Mohamed Adel Salem, Kanata (CA); Toufiqul Islam, Ottawa (CA); Jianglei Ma, Ottawa (CA); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/430,050

(22) Filed: Feb. 10, 2017

(65) Prior Publication Data

US 2018/0083817 A1 Mar. 22, 2018

Related U.S. Application Data

(60) Provisional application No. 62/395,865, filed on Sep. 16, 2016.

(51) Int. Cl.
*H04L 27/26* (2006.01)
*H04L 5/14* (2006.01)
*H04L 5/00* (2006.01)
*H04W 72/04* (2009.01)

(52) U.S. Cl.
CPC ........ *H04L 27/2607* (2013.01); *H04L 5/0005* (2013.01); *H04L 5/1469* (2013.01); *H04L 27/2602* (2013.01); *H04W 72/044* (2013.01)

(58) Field of Classification Search
CPC . H04L 27/2607; H04L 5/0005; H04W 72/044
See application file for complete search history.

(56) References Cited

U.S. PATENT DOCUMENTS

| 8,284,725 B2 * | 10/2012 | Ahmadi | H04W 8/22 370/254 |
| 2006/0215777 A1 * | 9/2006 | Krishnamoorthi | G06F 17/142 375/260 |
| 2008/0049709 A1 * | 2/2008 | Pan | H04B 7/0634 370/344 |

(Continued)

FOREIGN PATENT DOCUMENTS

| CN | 1960350 A | 5/2007 |
| CN | 101729138 A | 6/2010 |

(Continued)

OTHER PUBLICATIONS

ZTE et al., "Considerations about symbol boundary alignment", 3GPP TSG RAN WG1 Meeting #86, R1-166491, Aug. 22-26, 2016, 10 Pages, XP051142449, Gothenburg, Sweden.

(Continued)

*Primary Examiner* — Ronald B Abelson
(74) *Attorney, Agent, or Firm* — Slater Matsil, LLP

(57) ABSTRACT

Systems and methods of transmitting using different cyclic prefix types are provided. In some embodiments, the cyclic prefix type used changes on a per time interval based on characteristics of the traffic. In some embodiments, different cyclic prefix types are used simultaneously during a time interval for different traffic types.

22 Claims, 25 Drawing Sheets

(56) References Cited

U.S. PATENT DOCUMENTS

| | | | | |
|---|---|---|---|---|
| 2008/0084818 | A1* | 4/2008 | Yoon | H04L 1/0618 370/210 |
| 2011/0235701 | A1* | 9/2011 | Kim | H04N 7/20 375/240.02 |
| 2012/0155337 | A1* | 6/2012 | Park | H04L 1/1692 370/280 |
| 2012/0213130 | A1* | 8/2012 | Zhang | H04L 5/001 370/280 |
| 2012/0213143 | A1 | 8/2012 | Zhang et al. | |
| 2012/0320782 | A1 | 12/2012 | Seo et al. | |
| 2014/0247805 | A1 | 9/2014 | Li et al. | |
| 2015/0055541 | A1 | 2/2015 | Zhang et al. | |
| 2015/0117363 | A1 | 4/2015 | Rong et al. | |
| 2015/0195113 | A1 | 7/2015 | Kim et al. | |
| 2015/0358801 | A1* | 12/2015 | Seo | H04W 8/00 |
| 2015/0372843 | A1* | 12/2015 | Bala | H04L 25/03834 |
| 2016/0080121 | A1* | 3/2016 | Kim | H04L 5/005 370/329 |
| 2017/0215188 | A1* | 7/2017 | Kim et al. | H04W 72/0446 |
| 2018/0077710 | A1* | 3/2018 | Ly | H04W 72/04 |

FOREIGN PATENT DOCUMENTS

| | | | | |
|---|---|---|---|---|
| CN | 103109471 | A | | 5/2013 |
| CN | 103493421 | A | | 1/2014 |
| CN | 105493592 | A | | 4/2016 |
| CN | 105659683 | A | | 6/2016 |
| CN | 105871526 | A | | 8/2016 |
| CN | 201610658770.4 | | * | 8/2016 ............ H04L 27/04 |
| CN | 106559901 | A | | 4/2017 |

OTHER PUBLICATIONS

Nokia et al., "On symbol boundary alignment in New Radio", 3GPP TSG-RAN WG1#86, R1-167259, Aug. 22-26, 2016, 5 Pages, XP051140605, Gothenburg, Sweden.

Nokia et al., "On the URLLC transmission formats for NR TDD", 3GPP TSG-RAN WG1#86, R1-167269, Aug. 22-26, 2016, 8 Pages, XP051142024, Gothenburg, Sweden.

NTT DOCOMO, Inc., "On co-existence of eMBB and URLLC", 3GPP TSG RAN WG1 Meeting #86, R1-167391, Aug. 22-26, 2016, 5 Pages, XP051125879, Gothenburg, Sweden.

* cited by examiner

| Parameters | Set1 | Set2 | Set3 | Set4 | Set5 | Set6 | Set7 |
|---|---|---|---|---|---|---|---|
| Subcarrier-spacing(kHz) | 7.5 | 15 | 30 | 60 | 120 | 240 | 480 |
| OFDM symbol length (usec) | 133.33 | 66.67 | 33.33 | 16.67 | 8.33 | 4.17 | 2.08 |
| CP-length(usec)(NCP (Long NCP, Short NCP)/ECP) | (10.42,9.38) /33.3 | (5.21,4.69) /16.67 | (2.6, 2.34) /8.33 | (1.3, 1.17) /4.17 | (0.65, 0.59) * | (0.326, 0.29) * | (0.16,0.15) * |
| No. of symbols per sub-frame: 7(1 w/long NCP, 6 w/short NCP)/ 6 (single cp) | 7/6 | 7/6 | 7/6 | 7/6 | 7 | 7 | 7 |
| TTU length (ms) | 1 | 0.5 | 0.25 | 0.125 | 0.0625 | 0.03125 | 0.015625 |
| CP overhead(NCP/ECP) | 6.67% /20% | 6.67% /20% | 6.67% /20% | 6.67% /20% | 6.67% * | 6.67% * | 6.67% * |

FIG. 8

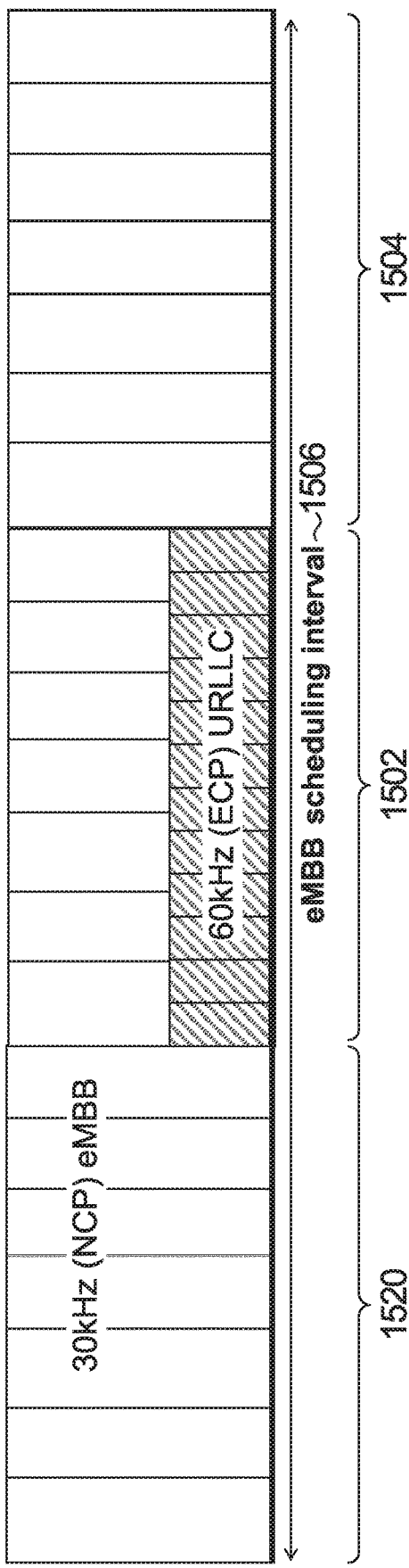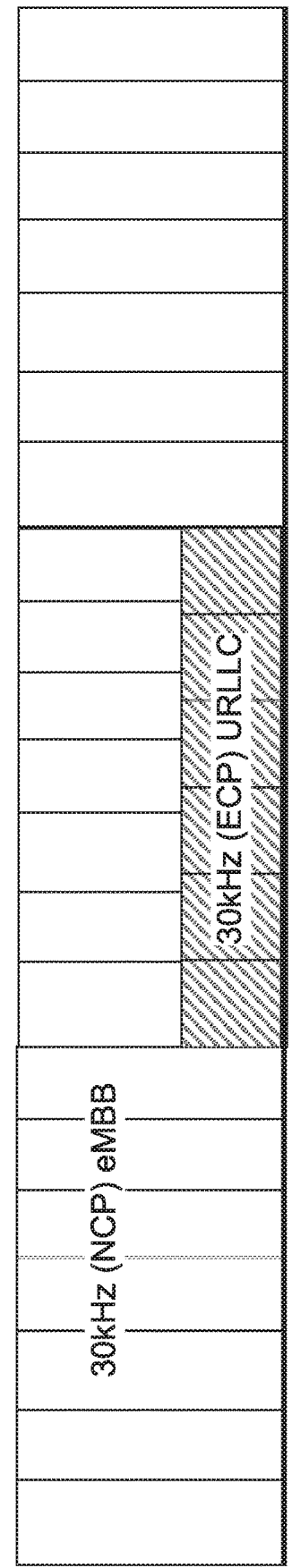
FIG. 15A
FIG. 15B

Example 1

Example 2

SYSTEMS AND METHODS FOR THE COEXISTENCE OF DIFFERING CYCLIC PREFIX LENGTHS

CROSS REFERENCE TO RELATED APPLICATION

This application claims priority to U.S. Provisional Application No. 62/395,865 entitled "Systems and methods for the coexistence of differing cycling prefix lengths for the same sub-carrier spacing" filed Sep. 16, 2016, which is hereby incorporated by reference in its entirety.

FIELD

The present application relates a method and system for the coexistence of differing cyclic prefix lengths.

BACKGROUND

Different UEs may be configured to transmit and receive of different types of traffic. Different cyclic prefix types that may be used include a normal cyclic prefix (NCP) and an extended cyclic prefix (ECP), but in conventional systems, traffic with differing CP types does not co-exist.

SUMMARY

According to one aspect of the present invention, there is provided a method comprising: during a first time interval, transmitting traffic of a first type in at least one time-frequency region during the first time interval, and transmitting traffic of a second type in at least one time-frequency region during the first time interval, with all traffic transmitted during the first time interval being transmitted with first cyclic prefix type based at least in part on characteristics of traffic to be sent during the first time interval.

Optionally, in any of the preceding embodiments the method further comprises: during each of a plurality of further time intervals, transmitting traffic of the first type in at least one time-frequency region during the further time interval, and transmitting traffic of the second type in at least one time-frequency region during the further time interval, with all traffic transmitted during the further time interval being transmitted with cyclic prefix type based at least in part on characteristics of traffic to be sent during the further time interval.

Optionally, in at least one of the time intervals, a first cyclic prefix type is employed and in at least one other of the time intervals, a second cyclic prefix type is employed.

In any of the preceding embodiments the method further comprises: for the first time interval and each of the plurality of further time intervals, setting the cyclic prefix type to be used during the time interval based at least in part on characteristics of traffic to be sent during the time interval.

Optionally, in any of the preceding embodiments, traffic of the first type is sent with a sub-carrier spacing that is the same as that for traffic of the second type.

Optionally, in any of the preceding embodiments, traffic of the first type is sent with a sub-carrier spacing that is different from that for traffic of the second type.

Optionally, in any of the preceding embodiments, setting a respective cyclic prefix type based at least in part on characteristics of traffic to be sent during the time interval comprises setting the respective cyclic prefix type based on at least one of: modulation and coding scheme used for some or all of the traffic to be transmitted during the time interval; payload; bandwidth allocated to each type of traffic.

Optionally, in any of the preceding embodiments, traffic of the first type is URLLC traffic and the traffic of the second type is eMBB traffic.

Optionally, in any of the preceding embodiments, each cyclic prefix type is one of normal cyclic prefix (NCP) and ECP (extended cyclic prefix).

According to another aspect of the present invention, there is provided a method comprising: during a first time interval, transmitting a signal comprising: traffic of a first type in a first time-frequency region during the first time interval with a first cyclic prefix type; traffic of a second type in a second time-frequency region during the first time interval with a second cyclic prefix type.

Optionally, the method further involves during at least part of the first time interval, transmitting traffic of multiple different traffic types inclusive of the first type in the first time-frequency region with the first cyclic prefix type; and during at least part of the time interval, transmitting traffic of multiple different traffic types inclusive of the second type in the second time-frequency region with the first cyclic prefix type.

Optionally, in any of the preceding embodiments, traffic of the first type is sent with a sub-carrier spacing that is the same as that for traffic of the second type.

Optionally, in any of the preceding embodiments, traffic of the first type is sent with a sub-carrier spacing that is different from that for traffic of the second type.

Optionally, in any of the preceding embodiments, the traffic of the first type is sent in a downlink portion of a first self-contained sub-frame structure comprising a downlink portion, a guard period and an uplink portion; wherein the traffic of the second type is sent in a downlink portion of a second self-contained sub-frame structure comprising a downlink portion, a guard period and an uplink portion; wherein the sub-frame structures have at least partially aligned guard periods such that the uplink portion of one sub-frame structure does not overlap in time with the downlink portion of the other sub-frame structure and vice versa.

Optionally, in any of the preceding embodiments, traffic of the first type is sent with a sub-carrier spacing that is the same as that for traffic of the second type.

Optionally, in any of the preceding embodiments, traffic of the first type is sent with a sub-carrier spacing that is different from that for traffic of the second type.

Optionally, in any of the preceding embodiments, the method further comprises for each time frequency region used to transmit traffic of the first type or traffic of the second type, setting a respective cyclic prefix type based at least in part on characteristics of traffic to be sent.

Optionally, in any of the preceding embodiments, the cyclic prefix type for each time frequency region is based on at least one of: modulation and coding scheme used for some or all of the traffic to be transmitted during the time interval; payload; bandwidth allocated to each type of traffic.

Optionally, in any of the preceding embodiments, the traffic of the first type is URLLC traffic and the traffic of the second type is eMBB traffic.

Optionally, in any of the preceding embodiments, each cyclic prefix type is one of normal cyclic prefix (NCP) and ECP (extended cyclic prefix).

Optionally, in any of the preceding embodiments, the method further comprises transmitting traffic of the first type over a scheduling interval that is an aggregate of multiple time intervals including the first time interval; wherein the second time-frequency region occupies resources punctured from the first time-frequency region.

Optionally, in any of the preceding embodiments, traffic of the first type is sent with a sub-carrier spacing that is the same as that for traffic of the second type.

Optionally, in any of the preceding embodiments, traffic of the first type is sent with a sub-carrier spacing that is different from that for traffic of the second type.

According to a further aspect of the present invention, there is provided a base station comprising: at least one transmit chain, each transmit chain comprising a sub-carrier mapper and grouper, an IFFT, and a pilot symbol and cyclic prefix inserter, each transmit chain operating with a respective sub-carrier spacing and a respective cyclic prefix type; wherein the base station is configured to use the at least one transmit chain during a first time interval to transmit traffic of a first type in at least one time-frequency region during the first time interval, and to transmit traffic of a second type in at least one time-frequency region during the first time interval, with all traffic transmitted during the first time interval being transmitted with first cyclic prefix type based at least in part on characteristics of traffic to be sent during the first time interval.

Optionally, in any of the preceding embodiments, the base station is further configured to, during each of a plurality of further time intervals, transmit traffic of the first type in at least one time-frequency region during the further time interval, and transmit traffic of the second type in at least one time-frequency region during the further time interval, with all traffic transmitted during the further time interval being transmitted with cyclic prefix type based at least in part on characteristics of traffic to be sent during the further time interval.

Optionally, in any of the preceding embodiments, the at least one transmit chain comprises a first transmit chain operating with a first sub-carrier spacing and a second transmit chain operating with a second sub-carrier spacing that is different from the first sub-carrier spacing, and wherein the base station is configured to transmit the traffic of the first type using the first transmit chain and to transmit the traffic of the second type using the second transmit chain.

According to still another aspect of the present invention, there is provided a base station comprising: at least two transmit chains, each transmit chain comprising a sub-carrier mapper and grouper, an IFFT, and a pilot symbol and cyclic prefix inserter, each transmit chain operating with a respective sub-carrier spacing and a respective cyclic prefix type; wherein a first transmit chain of said at least two transmit chains operates with the first cyclic prefix type to transmit traffic of a first type in a first time-frequency region during a first time interval; and a second transmit chain of said at least two transmit chains operates with the second cyclic prefix type to transmit traffic of a second type in a second time-frequency region during the first time interval.

Optionally, in any of the preceding embodiments, the first transmit chain operates with a sub-carrier spacing that is the same as that of the second transmit chain.

Optionally, in any of the preceding embodiments, the first transmit chain operates with a sub-carrier different from that of the second transmit chain.

According to still another aspect of the present invention, there is provided a method in a user equipment. The method involves receiving traffic of a first type within a first time-frequency region using a first cyclic prefix type and/or first sub-carrier spacing, wherein the first time-frequency region overlaps in an area of overlap with a second time-frequency region originally scheduled for traffic of a second type using a second cyclic prefix type and/or second sub-carrier spacing, and traffic within the second time-frequency region is punctured in the area of overlap.

Optionally, the method further comprises, at a time after transmission of scheduling information in respect of traffic of the second type within the second time frequency region, receiving an indication of the traffic within the first time-frequency region.

Optionally, the method further comprises transmitting an indication message to a network indicating support by the user equipment for one or more cyclic prefix types for each of at least one supported sub-carrier spacing.

According to still another aspect of the present invention, there is provided a user equipment having at least one receive chain, each receive chain comprising a sub-carrier de-mapper, an FFT, and a pilot symbol and cyclic prefix processor, each receive chain operating with a respective sub-carrier spacing and a respective cyclic prefix type. The UE is configured to receive traffic of a first type within a first time-frequency region using a first cyclic prefix type and/or first sub-carrier spacing, wherein the first time-frequency region overlaps in an area of overlap with a second time-frequency region originally scheduled for traffic of a second type using a second cyclic prefix type and/or second sub-carrier spacing, and traffic within the second time-frequency region is punctured in the area of overlap.

BRIEF DESCRIPTION OF THE DRAWINGS

Embodiments of the disclosure will now be described with reference to the attached drawings in which:

FIG. 8 is a chart showing a set of numerology examples;

FIG. 15A is an example of transmitting traffic of a first type over an aggregation of slots, and transmitting traffic of a second type by puncturing traffic of the first type within one of the slots and transmitting the traffic of the second type with a different cyclic prefix type and different sub-carrier spacing;

FIG. 15B is an example of transmitting traffic of a first type over an aggregation of slots, and transmitting traffic of a second type by puncturing traffic of the first type within one of the slots and transmitting the traffic of the second type with a different cyclic prefix type the same sub-carrier spacing.

DETAILED DESCRIPTION

Figure 1:
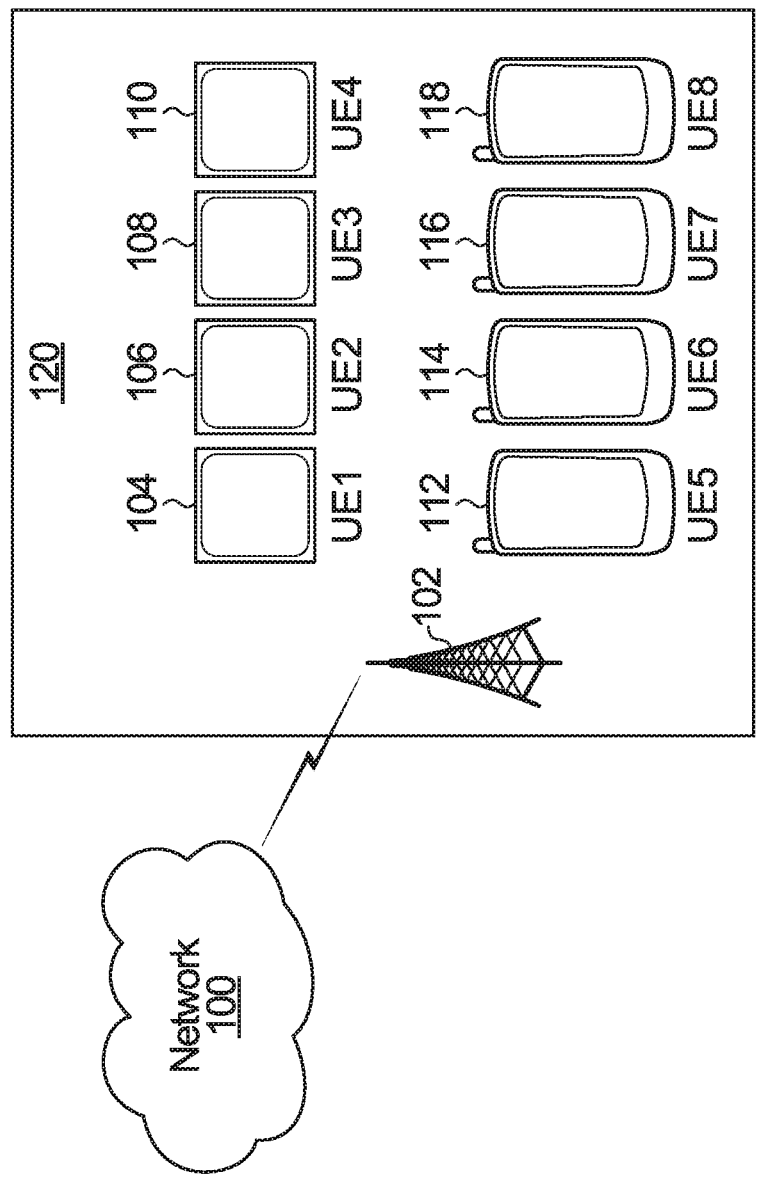
FIG. 1 is a block diagram of a network configured to implement coexistence of mixed services in a flexible frame structure.

Generally, embodiments of the present disclosure provide a method and system for the coexistence of differing cyclic prefix lengths. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

For the purpose of this description, a first traffic type user equipment (FTTUE) is a UE that is configured to transmit and receive traffic of a first type, for example eMBB (enhanced mobile broadband) traffic. A second traffic type UE (STTUE) is a UE that is configured to transmit and receive traffic of a second type, for example URLLC (ultra-reliable low latency communications) traffic. However, a given STTUE may also have other capabilities including handling traffic of the first traffic type. In some embodiments, the traffic of the first type is relatively delay-tolerant compared to the traffic of the second type. In a specific example, the traffic of the first type is eMBB traffic, and the traffic of the second type is URLLC traffic, eMBB traffic being relatively delay-tolerant compared to URLLC traffic.

Referring to FIG. 1, a schematic diagram of a network 100 is shown. A base station (BS) 102 provides uplink and downlink communication with the network 100 for a plurality of UEs 104-118 within a coverage area 120 of the BS 102. In a specific example, UEs 104-110 are STTUEs, and UEs 112-118 are FTTUEs. In a more specific example, the UEs 104-110 employ orthogonal frequency division multiplexing (OFDM) to transmit URLLC traffic. It is contemplated that OFDM may be used in combination with either an orthogonal multiple access scheme such as orthogonal frequency division multiple access (OFDMA) or a non-orthogonal multiple access scheme such as Sparse Code Multiple Access (SCMA). UEs 112-118 may, for example, transmit eMBB traffic. UEs 112-118 may also use OFDM. The BS 102 may, for example, be an access point. The described functions of the BS 102 may also be performed by multiple base stations using synchronous downlink transmission. FIG. 1 shows one BS 102 and eight UEs 104-118 for illustrative purposes, however there may be more than one BS 102 and the coverage area 120 of the BS 102 may include more or fewer than eight UEs 104-118 in communication with the BS 102.

Figure 2:
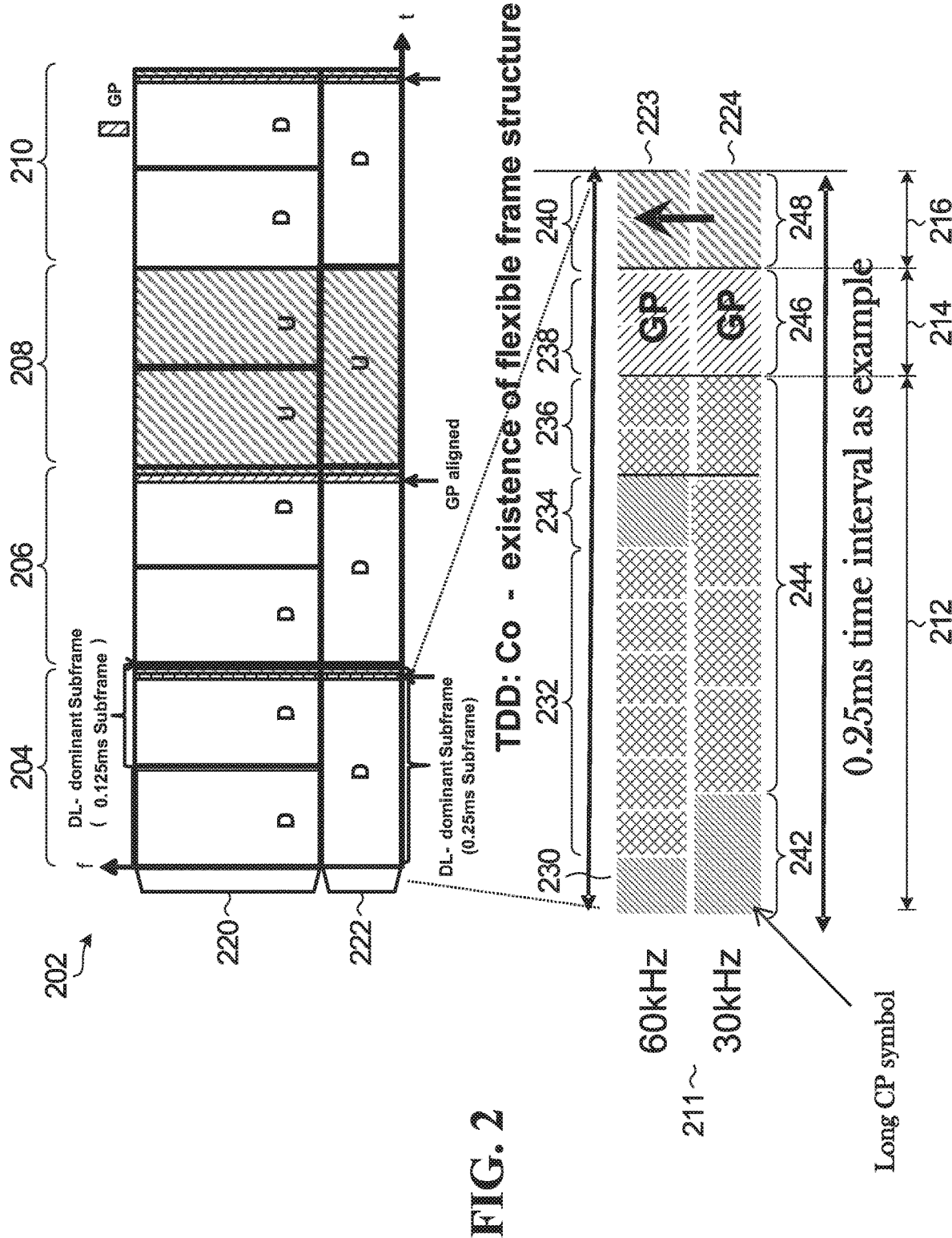
FIGS. 2, 3A, 3B, 3C, 4A, 4B, 5A, 5B and 6 are examples of frame structures provided by embodiments of the invention.

The network and the UEs of FIG. 1 communicate with each other using time division duplex (TDD) frame structures. Alternatively, the network and the UEs may use a different duplex frame structure, such as frequency division duplex (FDD) or a flexible or unified duplex frame structure. Each sub-frame has a downlink segment, an uplink segment and a guard period separating the downlink segment from the uplink segment. Referring to FIG. 2, shown is a specific example of a time division duplex frame structure 202. The frame structure 202 is composed of four sub-frames 204, 206, 208, 210. In some embodiments, sub-frames can be downlink dominant, meaning more resources are allocated for downlink traffic compared to uplink traffic; or uplink dominant, meaning more resources are allocated for uplink traffic compared to downlink traffic.

In some embodiments, the time duplex communications are transmitted in two or more sub-bands each operating with a respective different sub-carrier spacing. In the example of FIG. 2, shown are two sub-bands 220,222 operating with different sub-carrier spacings. Specifically, sub-band 220 operates with a 60 kHz sub-carrier spacing, and sub-band 222 operates with a 30 kHz sub-carrier spacing. It is contemplated that any two suitable sub-carrier spacings can be used. For example, two numerologies with different sub-carrier spacings can be chosen from a set of scalable numerologies having sub-carrier spacings that differ by a factor of $2^m$, where m is an integer. Some other examples of scalable numerologies include 15 kHz and 30 kHz sub-carrier spacings; and 15 kHz and 60 kHz sub-carrier spacings.

The TDD nature of each sub-frame is generally indicated at 211 which shows a self contained sub-frame structure including downlink segment 212, guard period 214 and uplink segment 216. For this example, OFDM symbols for data transmitted in the 60 kHz band have a time duration that is half that of OFDM symbols for data in the 30 kHz band. The contents of the sub-frame in the 60 kHz sub-band are indicated at 223 and include 14 OFDM symbols 230, 232, 234, and 236, followed by a guard period that includes two OFDM symbol durations 238, and two uplink symbols 240. The contents of the sub-frame in the 30 kHz sub-band are indicated at 224 and include 7 OFDM symbols 242, 244, followed by a guard period that includes one OFDM symbol duration 246, and then one uplink symbol 248. It should be understood that this design is implementation specific. However, importantly, the TDD structure of the contents in the two sub-bands is aligned in the sense that the uplink transmissions on one sub-band (e.g. the 60 kHz sub-band) are aligned with uplink transmissions in another sub-band (e.g. the 30 kHz sub-band), and a similar alignment is present for downlink transmissions and the guard period. More generally, for TDD embodiments, there needs to be an overlap in the guard periods within the different bands. One or more symbols, in this example the symbols 230 and 236, have a longer cyclic prefix than the remaining symbols 232, 236 of their sub-bands. Similarly, the symbol 242 has a longer cyclic prefix than the remaining symbols 244 of its sub-band. The different cyclic prefix durations may be used to ensure the desired alignment of the guard period and the uplink and downlink transmissions.

In the example of FIG. 2, the overall frame structure is 1 ms in duration, and the sub-frames are 0.25 ms in duration. In the 60 kHz band, each 0.25 ms sub-frame is further divided into two halves each of 0.125 ms. The frame structure 220 for the 60 kHz band includes symbols 230,232 in the first half and includes symbols 234,236,238,240 in the second half.

For each time division duplex frame structure, scheduling information in respect of downlink traffic of the first type is sent based on a predefined scheduling interval. The scheduling interval for traffic of the first type may be one or multiple sub-frames. The scheduling information schedules traffic of the first type during the downlink portions of the sub-frames during the scheduling interval. In addition, for each sub-frame, scheduling information is transmitted in respect of downlink traffic of the second type based on a scheduling interval equal to the duration of one sub-frame. For the example of FIG. 2, the scheduling interval is two sub-frames, and the scheduling information for the downlink traffic of the first type on the downlink portions of the two sub-frames is sent at the beginning of each scheduling interval, i.e. at the beginning of the first and third sub-frames. In this example, the duration of a sub-frame corresponds to the combined durations of the downlink portion, the uplink portion, and the guard period. The scheduling information for the traffic of the second type is sent at the beginning of each sub-frame, and is based on a 0.25 ms scheduling interval. The scheduling information indicates resources that are allocated for traffic of the first type or traffic of the second type in the respective scheduling interval.

In some embodiments, at some time after the first sub-frame, update information is transmitted that updates the scheduling information in respect of downlink traffic of the first type in a sub-frame other than the first sub-frame. Examples are presented below.

Figure 3A:
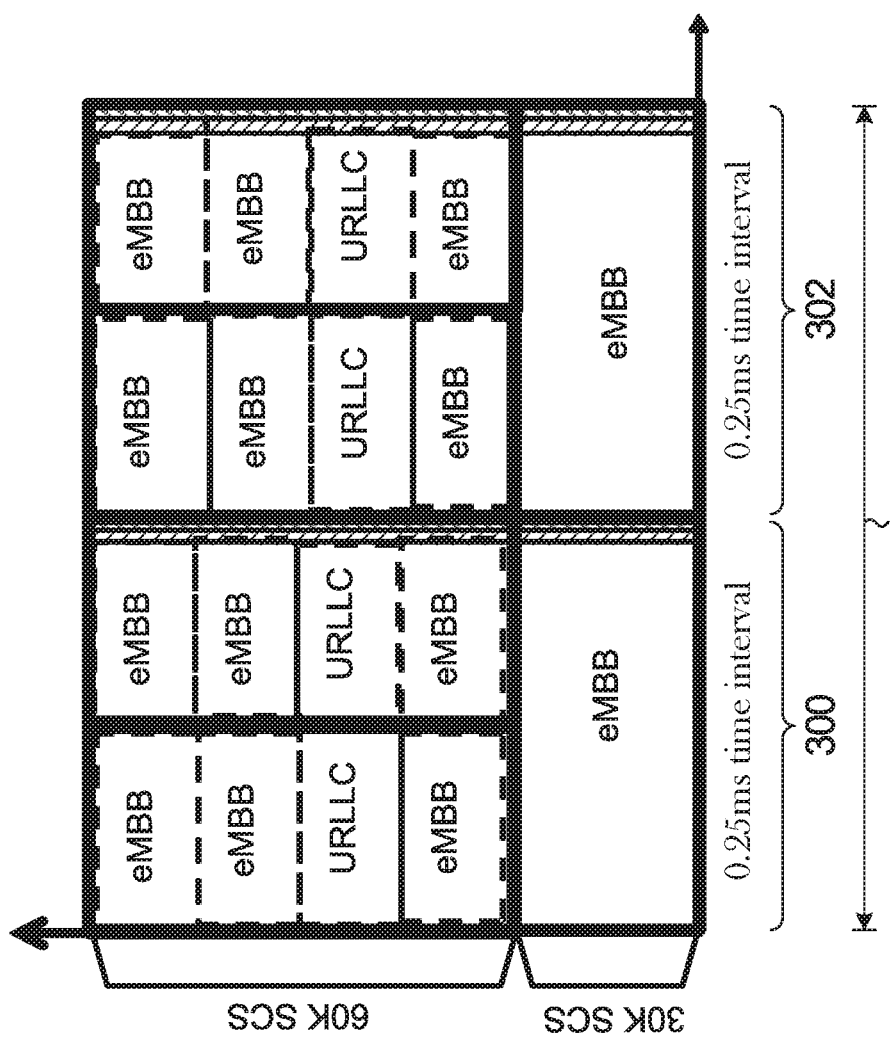

A first example is depicted in FIG. 3A. For this and the other examples, the traffic of the first type is eMBB traffic and the traffic of the second type is URLLC, but more generally, for any of these embodiments, other traffic types can be used instead. With the example of FIG. 3A, the eMBB scheduling interval is 0.5 ms, and spans two 0.25 ms scheduling intervals of URLLC traffic.

Figure 3B:
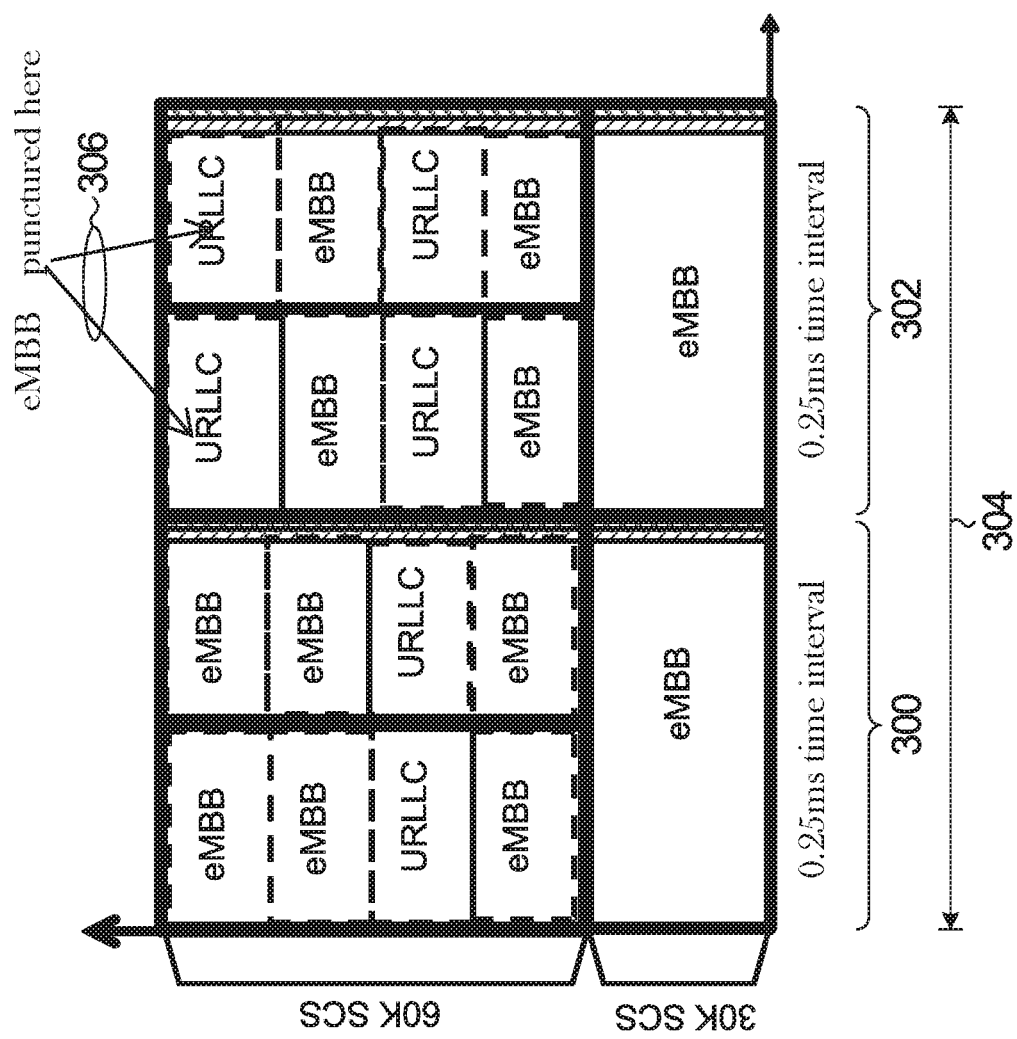

At the start of the eMBB scheduling interval 304, scheduling information is transmitted that allocates time frequency resources to eMBB traffic as indicated in FIG. 3A. For example, the scheduling information may be transmitted via dynamic control channels such as PDCCH in LTE or the equivalent. In addition, scheduling information is sent for URLLC traffic in the first sub-frame 300. At some point after the first sub-frame 300, update information is sent that updates the scheduling information, and this results in one or more time-frequency resources that were initially scheduled for traffic of the eMBB traffic in the second sub-frame (more generally in a sub-frame other than the first sub-frame) no longer being scheduled for eMBB traffic. The resulting allocation is depicted in FIG. 3B, which shows that eMBB traffic has been punctured at time frequency resources 306. The update information can be communicated in any known manner, and indicates to the eMBB UE that some or all of the time frequency resources originally scheduled for eMBB traffic have been punctured. As a result, the eMBB UE can decode its received transmission without considering the punctured regions, thereby potentially reducing decoding errors.

Figure 3C:
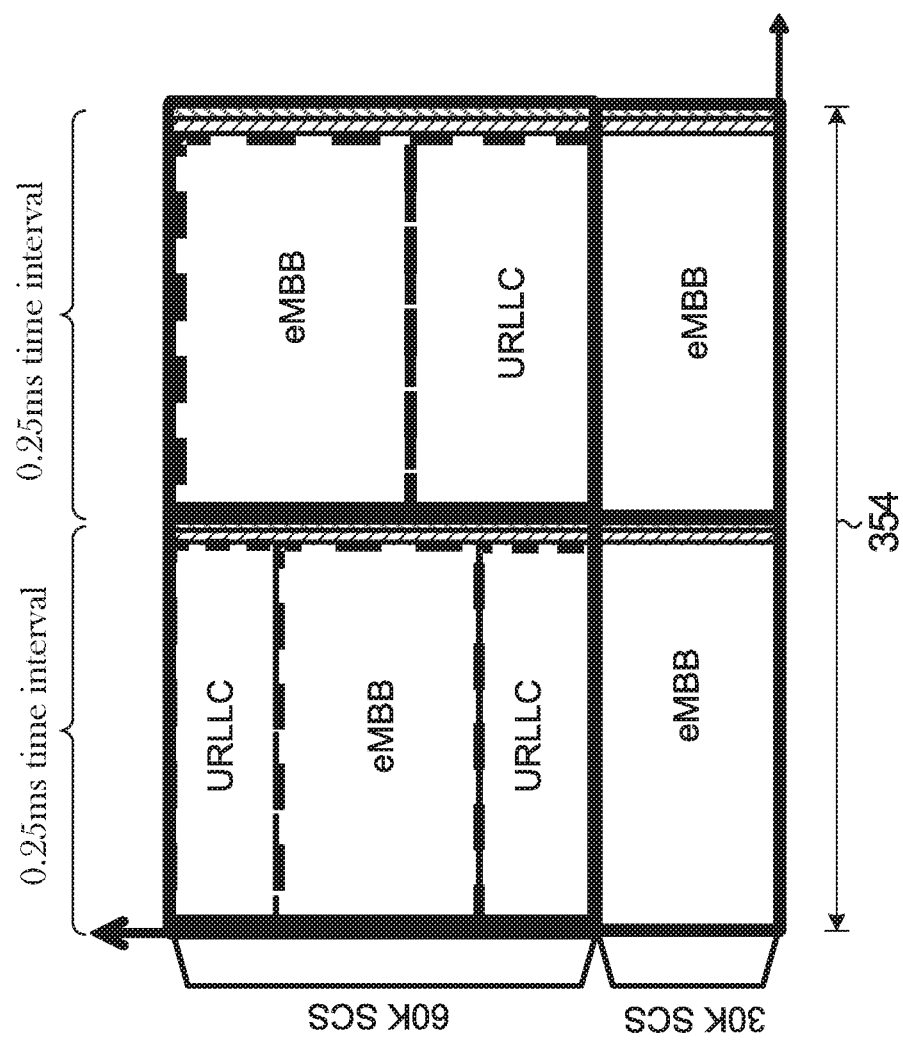

Referring now to FIG. 3C, in an alternative example the eMBB-only scheduling interval 354 has a duration of 0.5 ms, which corresponds to one scheduling interval in the 30 kHz sub-band that is reserved for eMBB traffic. In the 60 kHz sub-band, the scheduling interval for both URLLC traffic and eMBB traffic is 0.25 ms. It is contemplated that the scheduling interval in the sub-band reserved for eMBB traffic could be any integer multiple of the scheduling interval carrying both types of traffic. It is further contemplated that the scheduling interval for the sub-band that carries both types of traffic could be any suitable value that accommodates the latency tolerance of the URLLC traffic. In this embodiment, puncturing of the eMBB traffic is not needed, and the eMBB UE does not need to monitor the channel for update information or puncturing information, because URLLC traffic in the second scheduling interval can be accommodated by dynamic scheduling of the eMBB traffic in that scheduling interval.

Figure 4A:
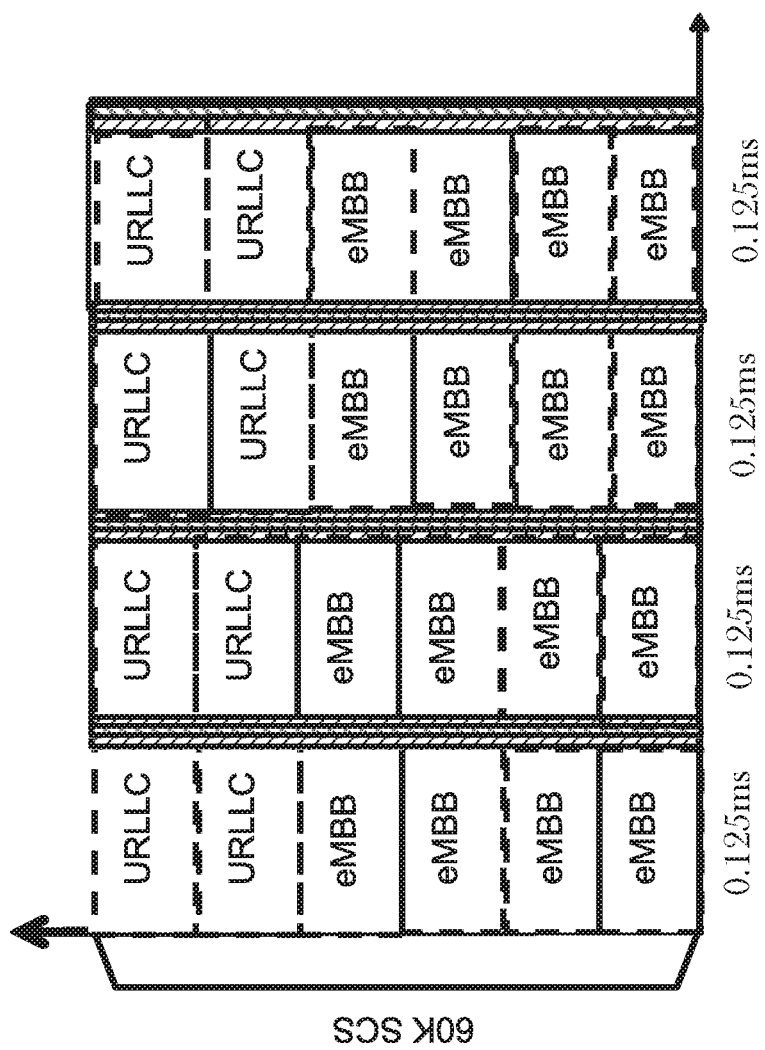
Figure 4B:
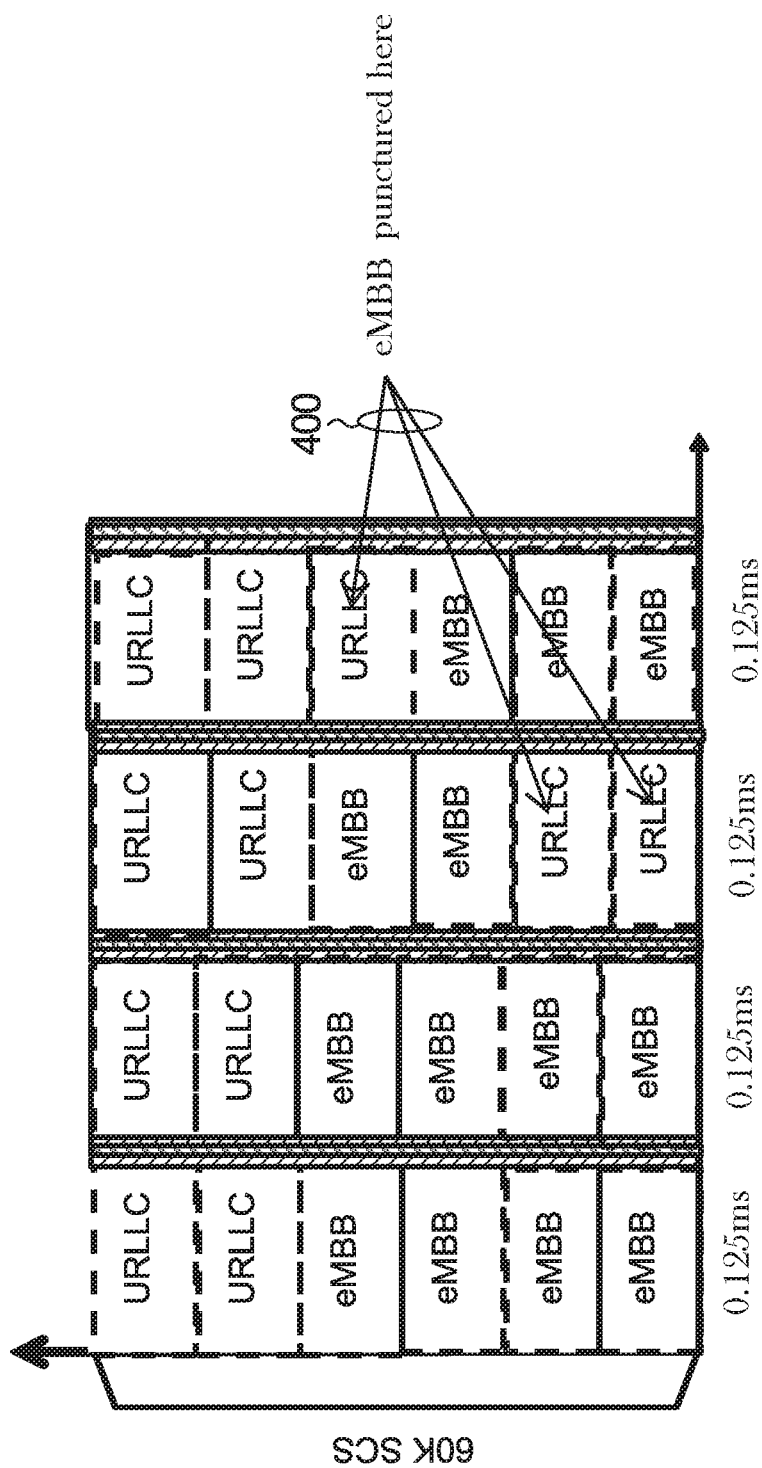

A second example is depicted in FIG. 4A. With the example of FIG. 4A, the eMBB scheduling interval is 0.5 ms, and spans four 0.125 ms scheduling intervals of URLLC traffic. FIGS. 4A and 4B show before and after puncturing views of the scheduling of both eMBB and URLLC traffic. At some point after the first sub-frame, update information has been sent indicating that eMBB traffic is being punctured in time frequency regions 400.

In some embodiments, eMBB and URLLC assignment does not change during their respective scheduling interval, unless eMBB data is punctured. Downlink signaling to update the eMBB scheduling may appear at the beginning of each subsequent URLLC sub-frame within the eMBB scheduling interval, starting from the second URLLC sub-frame.

In some embodiments the update information is information specifically for the eMBB UEs indicating that some of their time frequency resources are punctured. Alternatively, scheduling information for the URLLC UEs that conflicts with previous eMBB scheduling can function as the update information. Alternatively, control information at the beginning of the second sub-frame can be interpreted as update information. The control information can alternatively act as downlink control information in the embodiment described below with reference to FIG. 3C, where the resources are allocated by dynamic scheduling instead of by puncturing.

For the example of FIG. 3A, the update information may appear at the beginning of the second 0.25 ms interval in the 60K band. For the example of FIG. 4A, the update information may appear at the beginning of the $2^{nd}$, $3^{rd}$, and $4^{th}$ 0.125 ms interval.

More generally, for this embodiment and other embodiments described herein, the update information can be transmitted at any time up until the end of the eMBB scheduling interval, as a collective indicator to notify any changes in eMBB transmission during $2^{nd}$ and subsequent URLLC sub-frames within the eMBB scheduling interval.

Figure 5A:
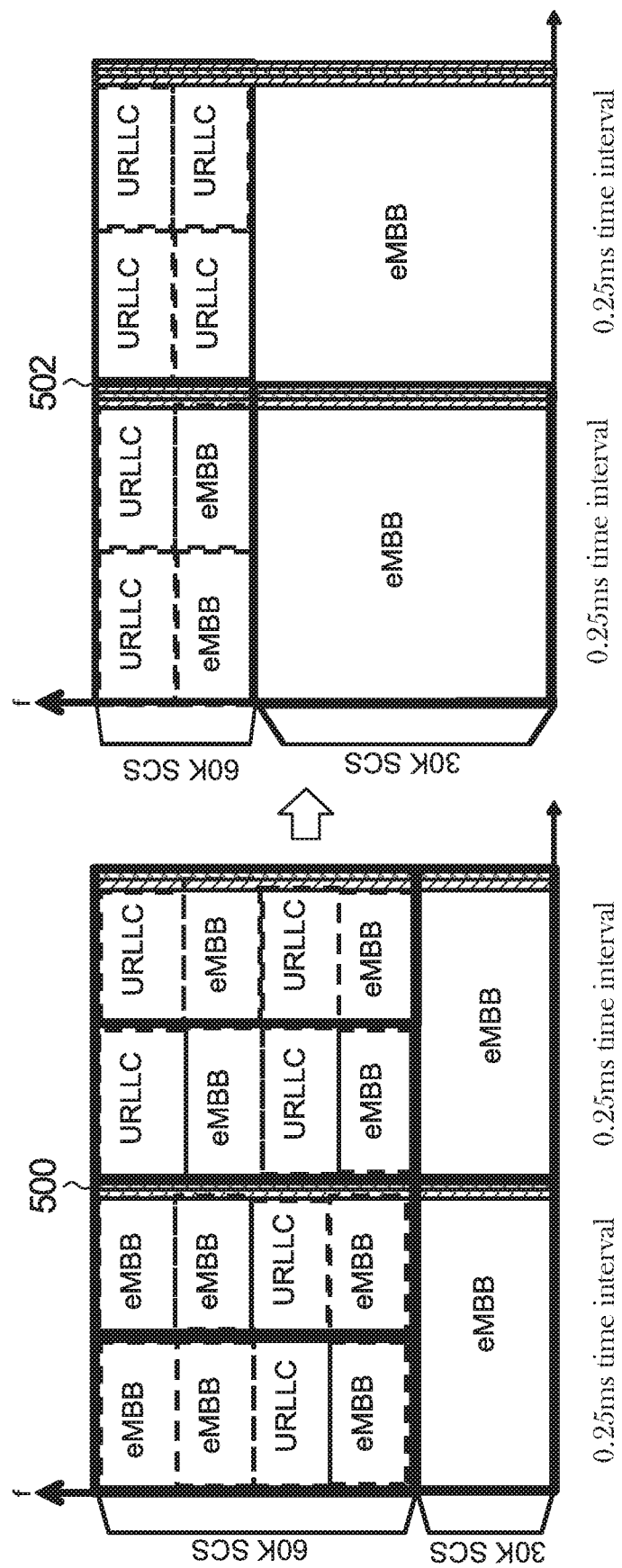

Some embodiments include dynamic sub-band bandwidth adjustment and/or a change in sub-carrier spacing assignments. A specific example will be described with reference to FIG. 5A which shows first and second eMBB scheduling intervals 500, 502 each having two 0.25 sub-frames. After the eMBB scheduling interval 500, the bandwidth of the 30 kHz and 60 kHz sub-bands is updated. This can be signalled to UEs, for example at the start of the second eMBB scheduling 502. The update can, for example, be based on traffic load for traffic of the URLLC and eMBB traffic types.

Figure 5B:
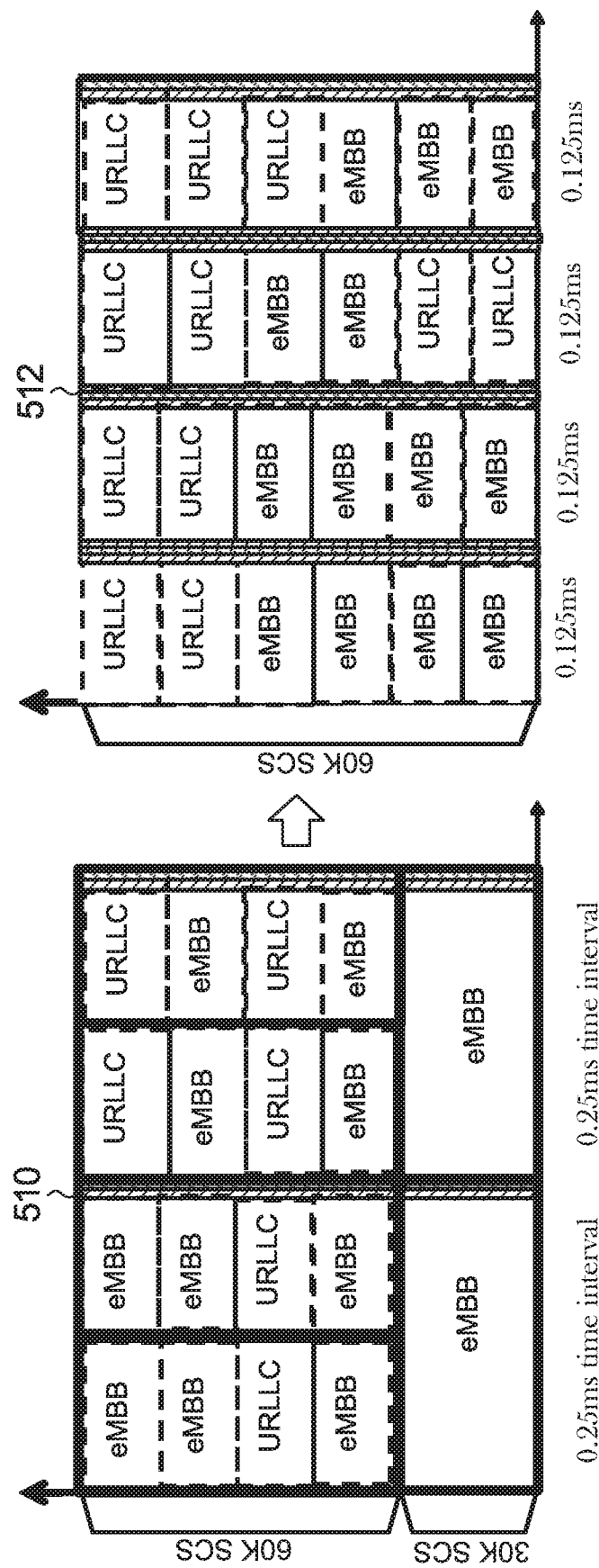

Another example is depicted in FIG. 5B where the entire bandwidth is switched to the sub-carrier spacing suitable for the second traffic type (60 kHz in this example), with a self contained interval (i.e. uplink, guard and downlink) of 0.125 ms. For this example, the eMBB traffic is still scheduled over the scheduling interval of 0.5 ms.

Figure 6:
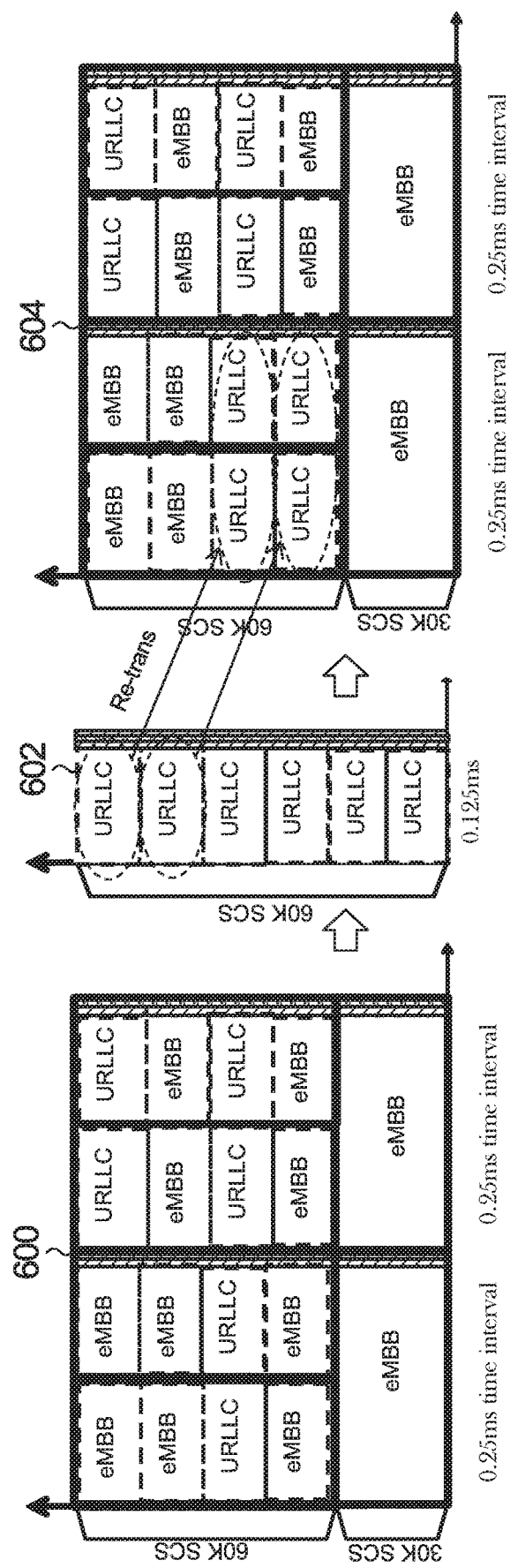

In some embodiments, FDM (frequency division multiplexing) and TDM (time division multiplexing) numerologies are combined. An example is depicted in FIG. 6. FIG. 6 shows a first time division duplex frame structure 600 similar to those described previously, where FDM is used to separate the 30 kHz numerology from the 60 kHz numerology. Following the initial sub-frame 600 is a time period 602 allocated to URLLC traffic only, i.e. TDM is used to separate the 60 kHz numerology. Following that is another time division duplex frame structure 604 in which FDM is used to separate the 30 kHz numerology from the 60 kHz numerology.

In some embodiments, for certain retransmissions, for example for retransmissions to some UEs having outstanding unsuccessful transmissions, the scheduler adopts a lower modulation and coding scheme (MCS) for the retransmission for increased reliability. Referring to FIG. 6, in a specific example, the code rate for retransmission is reduced such that the resources allocated for retransmissions within sub-frame 604 are twice those of a new transmission in time interval 602.

For any of the embodiments described herein, various different methods can be employed for determining for a given time division duplex sub-frame whether to transmit the update information to update the scheduling information for traffic of the first type.

In some embodiments, this involves:
receiving ACK/NACK information in respect of traffic of the second type; and
using the received ACK/NACK information to determine whether to puncture resources scheduled for traffic of the first type to allow retransmission of a block of traffic of the second type, the update information identifying the punctured resources.

In some embodiments this involves:
identifying the existence of new data to send using traffic of the second type or determining an amount of new data to send using traffic of the second type;
determining whether to puncture resources scheduled for traffic of the first type to allow transmission of new data using traffic of the second type based on the identified existence or the determined amount, the update information indicating the punctured resources.

In some embodiments, this involves:
receiving ACK/NACK information in respect of traffic of the first type;
based on the received ACK/NACK information, determining whether to re-assign some resources as between receivers of traffic of the first type, the update information indicating the re-assignment of resources.

For the embodiments described, the update information may indicate where resources for traffic of the first type are to be punctured. Alternatively, the update information may indicate a re-assignment of resources as between different first traffic type UEs.

In some embodiments, scheduling traffic of the second type comprises scheduling a block of traffic of the second type during one of the sub-frames, and scheduling the same block of traffic of the second type during another of the sub-frames with or without frequency hopping. For example, with reference to FIG. 3A, the two URLLC transmissions during sub-frame 300 may be transmissions of the same URLLC block with frequency hopping, and the two URLLC transmissions during the punctured locations 306 may be transmissions of the same URLLC block without frequency hopping.

In some embodiments, orthogonal scheduling is used as between traffic of the first type and traffic of the second type. This is the case for the examples described above. In other embodiments, non-orthogonal scheduling is used as between traffic of the first type and traffic of the second type, such that for at least some time-frequency resources, traffic of the first type is superimposed with traffic of the second type.

For all of the embodiments described, a different longer scheduling interval is employed for traffic of the first type compared to a scheduling interval used for traffic of the second type. Puncturing can be used to revise the allocation to traffic of the first type without waiting for the beginning of the next longer scheduling interval.

In an alternative, the same scheduling interval is used for traffic of the first type and for traffic of the second type. When this is the case, rather than employing puncturing to update the allocation to traffic of the second type within a comparatively long scheduling interval suitable for traffic of the first type, scheduling can be used to update the allocation to traffic of the first type within a scheduling interval suitable for traffic of the second type. This approach can be used with the examples described. For example, referring to FIG. 4A, the scheduling interval of 0.125 ms can be used for both URLLC traffic and eMBB traffic. New eMBB scheduling information is sent at the start of each 0.125 ms sub-frame. Thus, rather than puncturing time frequency resources 400, scheduling is used to allocate these to URLLC as opposed to eMBB. In some implementations featuring a common scheduling interval, some resources are reserved for eMBB traffic. For example, the bottom two rows of FIG. 4A could be reserved for eMBB traffic meaning only eMBB traffic can be scheduled using those resources, with remaining resources being available to be scheduled for eMBB or URLLC traffic. The other features described herein can be equally applied to embodiments with common scheduling interval.

Figure 7A:
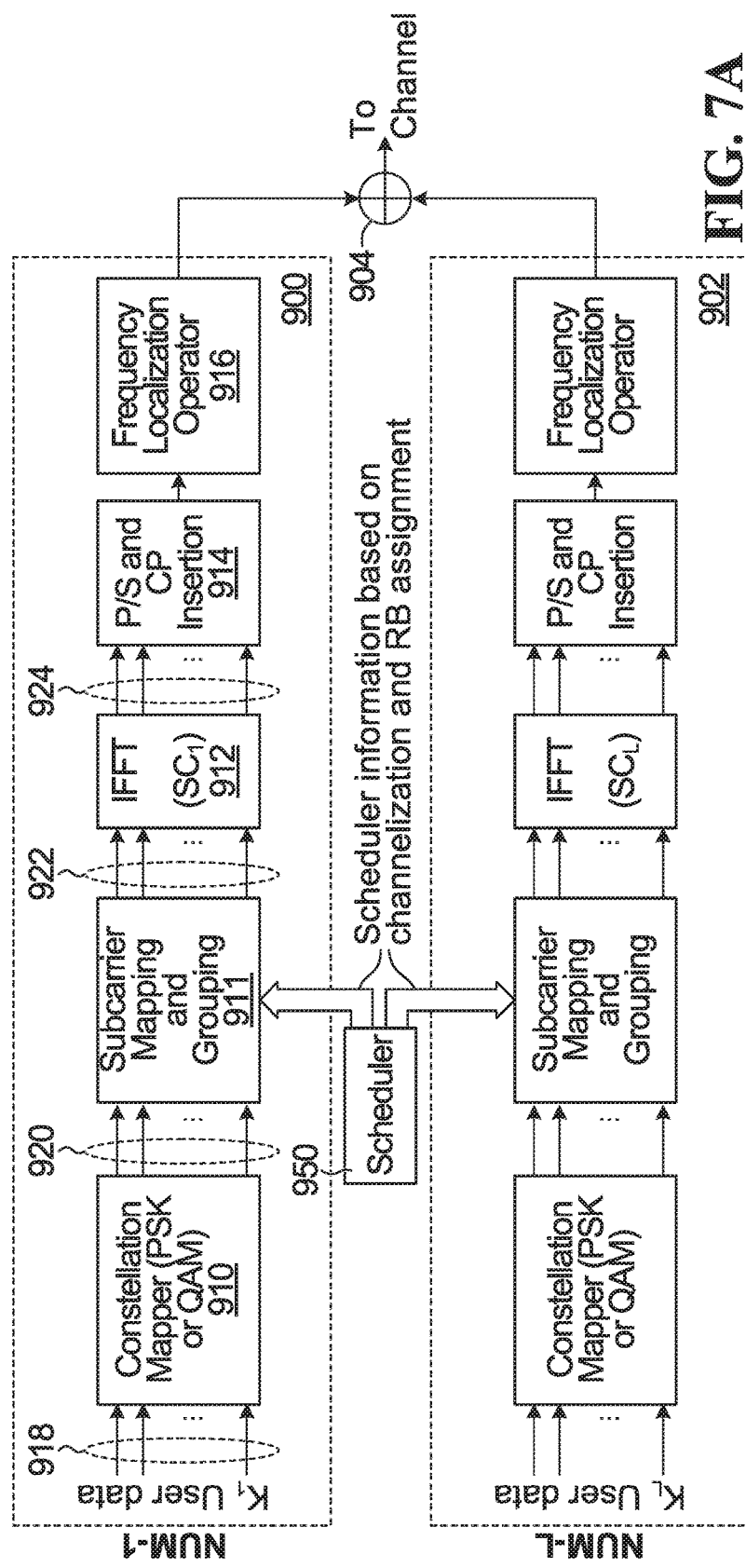
FIGS. 7A and 7B are block diagrams of a base station transmitter and receiver, respectively.

Referring now to FIG. 7A, shown is a simplified diagram of part of a base station that can operate using multiple numerologies. In this example, there are L supported numerologies, where L>=2, each numerology operating over a respective sub-band with a respective sub-carrier spacing. Furthermore, when the same sub-carrier spacing is being used for two transmissions in the same time interval with two different cyclic prefix types, as described with reference to FIGS. 11A and 11B below, two transmit chains are used with the same sub-carrier spacing, one for each cyclic prefix type. Because these two transmissions are not orthogonal and may interfere with each other if they are transmitted in adjacent frequency regions, they each require a distinct filter or other suitable means to mitigate this interference, as will be discussed below in further detail. For this purpose, the two transmissions with the same sub-carrier spacing and different cyclic prefix lengths can be considered different numerologies.

For each numerology, there is a respective transmit chain 900, 902. FIG. 8A shows simplified functionality for the first and Lth numerology; the functionality for other numerologies would be similar. Also shown in FIG. 8B is simplified functionality for a receive chain 903 for a receiver operating using the first numerology.

The transmit chain 900 for the first numerology includes a constellation mapper 910, sub-carrier mapping and grouping block 911, IFFT 912 with sub-carrier spacing $SC_1$, pilot symbol and cyclic prefix insertion 914, and frequency localization operator 916 (for example filtering, sub-band filtering, windowing, sub-band windowing). Also shown is a scheduler 900 that performs scheduling. It is noted that depending on the frequency localization operator implementation, different guard zones may be needed at the two edges of the spectrum and/or between sub-bands with different numerologies (i.e. different sub-carrier spacings). In some embodiments, the guard zones are determined taking into account frequency localization capabilities of both the transmitter and receiver. Also shown is a feedback generator 954.

In operation, constellation mapper 910 receives UE data (more generally, UE content containing data and/or signalling) for $K_1$ UEs, where $K_1 \geq 1$. The constellation mapper 910 maps the UE data for each of the $K_1$ UEs to a respective stream of constellation symbols and outputs this at 920. The number of UE bits per symbol depends on the particular constellation employed by the constellation mapper 910. In the example of quadrature amplitude modulation (QAM), 2 bits from for each UE are mapped to a respective QAM symbol.

For each OFDM symbol period, the sub-carrier mapping and grouping block 911 groups and maps the constellation symbols produced by the constellation mapper 910 to up to P inputs of the IFFT 912 at 922. The grouping and mapping is performed based on scheduler information, which in turn is based on a TDD frame structure such as describe above, in accordance with a defined resource block definition and allocation for the content of the $K_1$ UEs being processed in transmit chain 900. P is the size of the IFFT 912. Not all of the P inputs are necessarily used for each OFDM symbol period. The IFFT 912 receives up to P symbols, and outputs P time domain samples at 924. Following this, in some implementations, time domain pilot symbols are inserted and a cyclic prefix is added in block 914. The frequency localization operator 916 may, for example, apply a filter $f_1(n)$ which limits the spectrum at the output of the transmit chain 900 to prevent interference with the outputs of other transmit chains such as transmit chain 902. The frequency localization operator 916 also performs shifting of each sub-band to its assigned frequency location.

The functionality of the other transmit chains, such as transmit chain 902 is similar. The outputs of all of the transmit chains are combined in a combiner 904 before transmission on the channel.

Figure 7B:
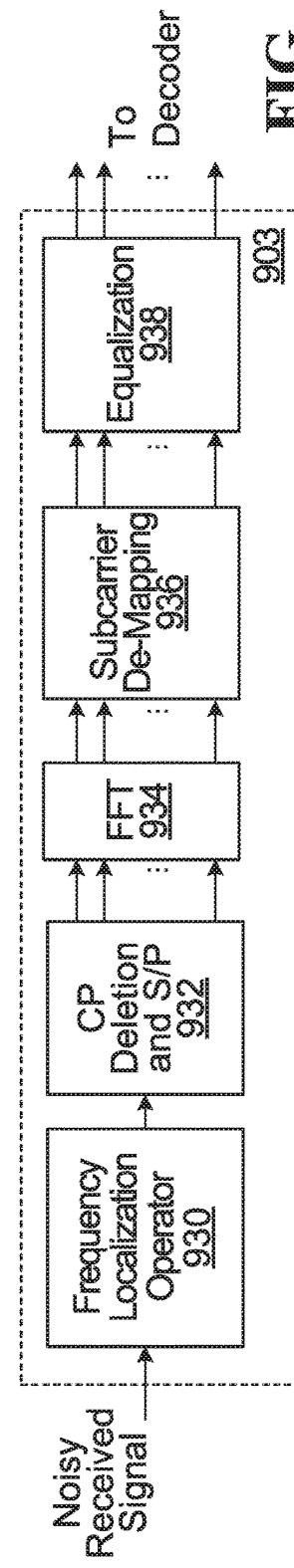

FIG. 7B shows a simplified block diagram of a receive chain for a base station receiving using a first numerology depicted at 903. This functionality would be replicated where multiple numerologies are supported. The receive chain 903 includes frequency localization operator 930, cyclic prefix deletion and pilot symbol processing 932, fast Fourier transform (FFT) 934, sub-carrier de-mapping 936 and equalizer 938. Each element in the receive chain performs corresponding reverse operations to those performed in the transmit chain.

The transmit chain of a UE may be similar to that of a base station although there would be no scheduler. The receive chain of a UE may be similar to that of a base station.

Coexistence of Different Cyclic Prefix Types

In some embodiments, systems and methods are provided that allow for coexistence of different cyclic prefix types. These embodiments will be described with reference to URLLC and eMBB, but as discussed before, these embodiments apply more generally to traffic of first and second types. It should be clearly understood that these embodiments that allow for the coexistence of different cyclic prefix types, can be implemented on a standalone basis, or in combination with one of the previously described embodiments relating to combining traffic of two types.

FIG. 8 shows a very specific set of numerology examples. Shown are seven numerology examples each characterized by a respective set of parameters (Set 1, . . . , Set 7). The first row indicates a sub-carrier spacing in kiloHertz (kHz). The second row is the OFDM symbol length in μs. The third row is the cyclic prefix length. The first four sets of parameters have two possibilities for cyclic prefix length, one for normal cyclic prefix (NCP) and one for extended cyclic prefix (ECP) separated by a "/". For NCP, in each sub-frame there is a first symbol with a first cyclic prefix (long NCP) and remaining symbols of the sub-frame have a slightly shorter cyclic prefix (short NCP). For ECP, all symbols have the same cyclic prefix. The corresponding number of OFDM symbols per sub-frame is indicated in the fourth row. When the number of OFDM symbols is different for the two cyclic prefix possibilities, two numbers of symbols per sub-frame are indicated, also separated by a "/". Taking Set 1 for example, the NCP cyclic prefix length is 10.42, 9.38, which indicates a 10.42 μs long NCP for one symbol out of a total of seven symbols in the sub-frame, and 9.38 μs short NCP for other symbols of the sub-frame. The ECP cyclic prefix length is 33.3 μs for all symbols of a sub-frame containing 6 OFDM symbols. The fifth row is the transmit time unit (TTU) duration, i.e. the time to transmit the number of symbols referred to in the fourth column. The cyclic prefix overhead for NCP and ECP is indicated in the sixth column, again separated by a "/". No ECP definition is provided for sets 5, 6 and 7. The examples that follow are based on the NCP and ECP definitions described. However, more generally, they apply to any set of two or more differing cyclic prefix definitions.

In some embodiments, from one interval to another within which eMBB and URLLC traffic may coexist, the CP type is changed. For a given time interval, the selection of which CP to use can be made in dependence on one or a combination of:

the modulation and coding scheme (MCS)
payload, and
bandwidth occupied by the traffic;
or on some other basis.

For example, if eMBB is scheduled in a 60 kHz band, NCP may be used up to a moderate MCS, for example, 64 QAM, whereas for a higher MCS, for example, 256 QAM, a cyclic prefix length corresponding to the ECP may be used.

Figures 9A, 9B:
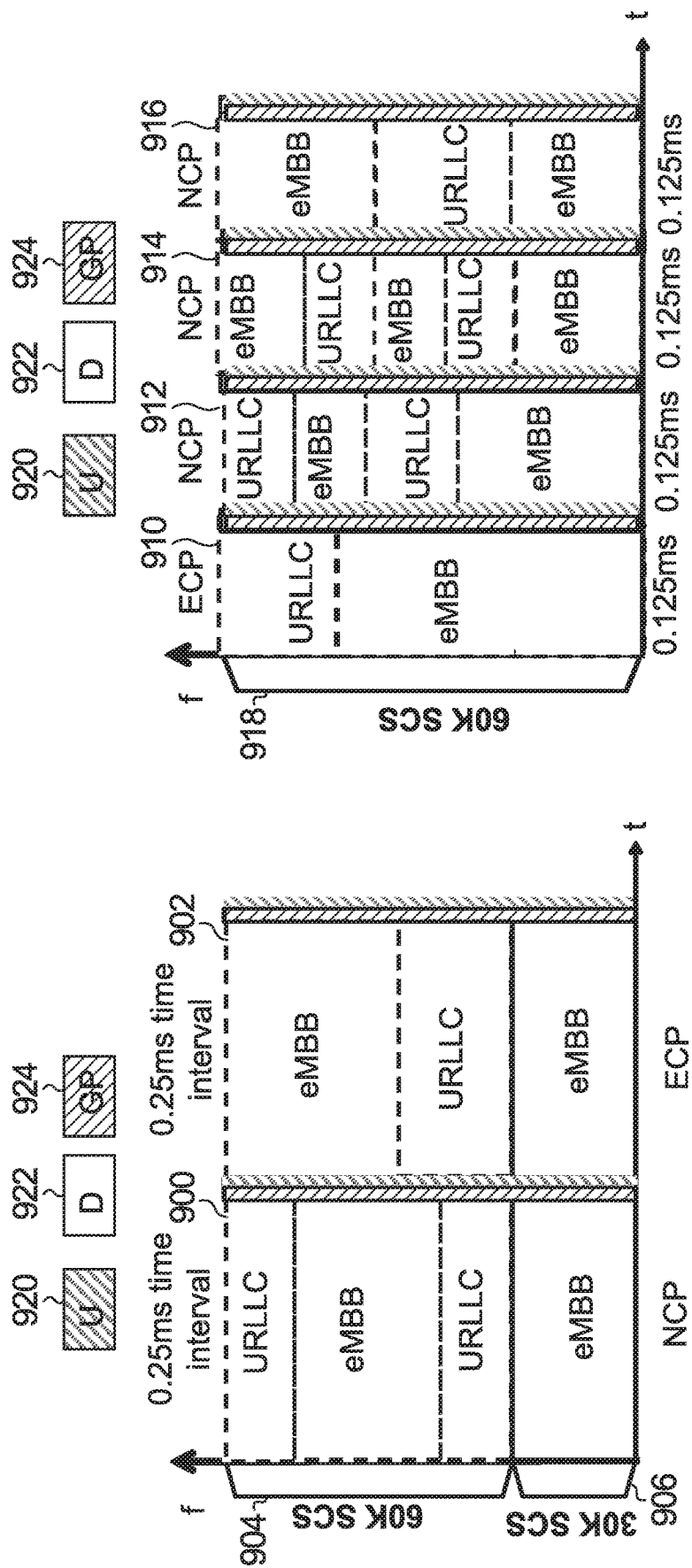
FIGS. 9A and 9B show time frequency allocations for URLLC and eMBB where a cyclic prefix type varies from one time period to another.

Two examples are depicted in FIGS. 9A and 9B. For both examples, uplink traffic is indicated at 920, downlink traffic is indicated at 922 and guard periods that separate downlink and uplink traffic are indicate at 924. A first example is indicated in FIG. 9A. For this example, in a first 0.25 ms time interval 900, all traffic is sent with NCP, and in a second 0.25 ms time interval 902, all traffic is sent with ECP. This includes traffic for URLLC and eMBB on a sub-band 904 operating with a 60 kHz sub-carrier spacing, and traffic for eMBB on a sub-band 906 operating with a 30 kHz sub-carrier spacing.

A second example is indicated in FIG. 9B. For this example, in a first 0.125 ms time interval 910, all traffic is sent with ECP; in a second 0.125 ms time interval 912, all traffic is sent with NCP; in a third 0.125 ms time interval 914, all traffic is sent with NCP, and in a fourth 0.125 ms time interval 916, all traffic is sent with NCP. Each time interval includes traffic for URLLC and eMBB on a sub-band 918 operating with a 60 kHz sub-carrier spacing. With the second example, both URLLC and eMBB traffic are scheduled within the 0.125 ms interval thereby supporting tighter latency requirement for URLLC compared to the first example.

With the above examples, at a given time instant, all traffic is sent with the same cyclic prefix type, and that can change from one time interval to another. The transmitters and receivers described with reference to FIGS. 7A and 7B can be configured to perform CP insertion that varies on a time interval basis. In some embodiments, signaling is employed to inform receivers of the CP used in each time interval. A different transmit chain 900,902 is used for each numerology, in this case requiring a transmit chain for the 60 kHz sub-carrier spacing and a transmit chain for a 30 kHz sub-carrier spacing.

Figure 10:
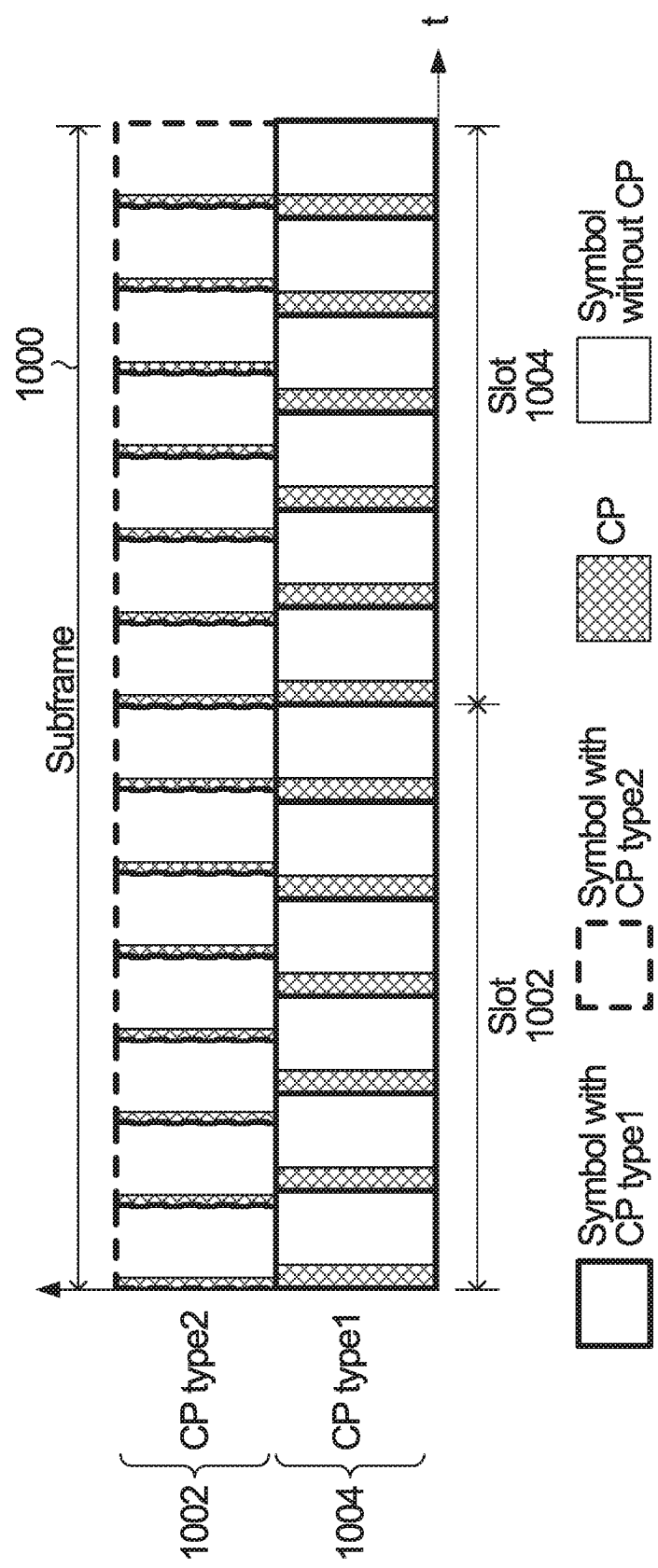
FIG. 10 depicts subframe definitions for the simultaneous coexistence of two different cyclic prefix types.

In another embodiment, different cyclic prefixes are configured to coexist in a common sub-frame interval. Referring now to FIG. 10, shown is an example of a sub-frame interval 1000 that can accommodate 14 symbols 1002 with a cyclic prefix type 2 (e.g. NCP), or 12 symbols 1004 with a cyclic prefix type 1 (e.g. ECP).

The sub-frame may be further sub-divided into slots 1002,1004, with ECP and NCP transmissions aligned at the slot boundaries. In this example, the ECP and NCP transmission align within slot 1002, such that the beginning of the first NCP symbol is aligned with the beginning of the first ECP symbol, and the end of the seventh NCP symbol is aligned in time with the end of the sixth ECP symbol. Similarly, in slot 1004, the beginning of the $8^{th}$ NCP symbol is aligned with the beginning of the $7^{th}$ ECP symbol, and the end of the $14^{th}$ NCP symbol is aligned with the end of the $12^{th}$ ECP symbol. With this approach, the traffic with type 1 cyclic prefix will need to be separated from the traffic with type 2 cyclic prefix with a filter, due to non-orthogonal transmission. Slotwise alignment permits these intervals to be scheduled independently. For 60 kHz subcarrier spacing, the slots may, for example be 0.125 ms in duration. The same approach may be extended to mixed cyclic prefix coexistence with different sub-carrier spacings. An example of this is described below with reference to FIGS. 13 and 14.

Figure 11:
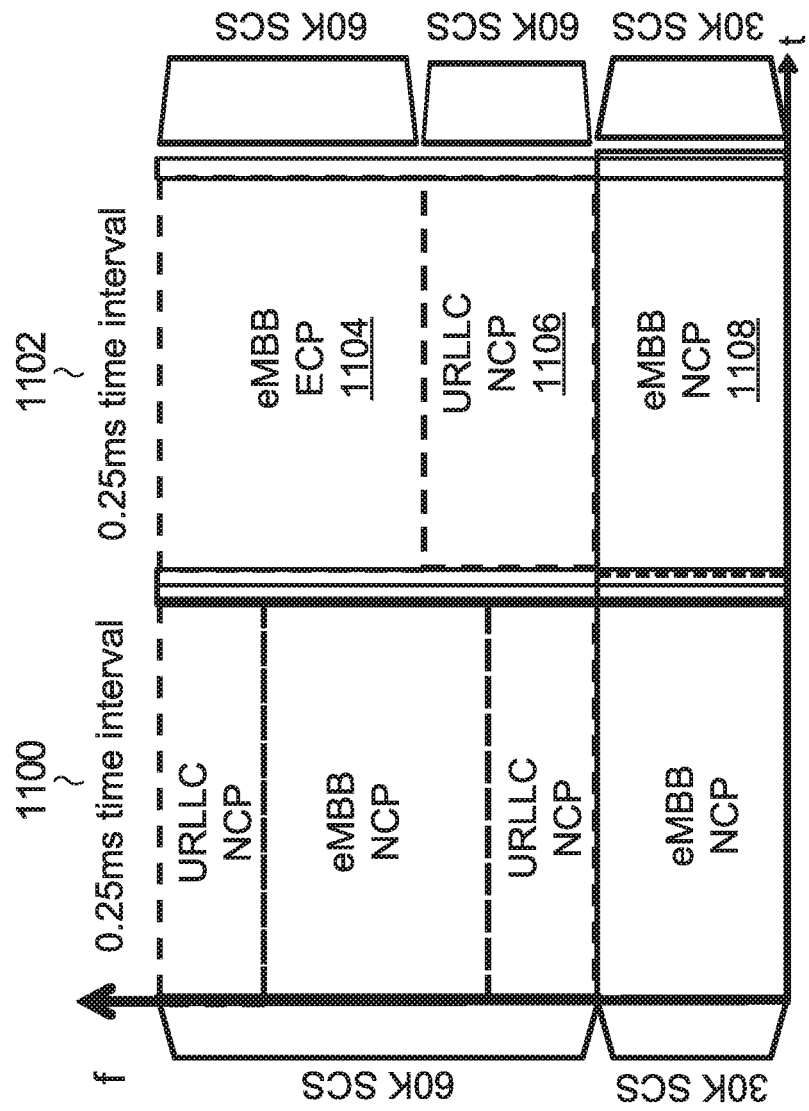
FIG. 11 shows time frequency allocations for URLLC and eMBB where a cyclic prefix type varies within one time period such that different cyclic prefix types are used in the same time interval with the same sub-carrier spacing.

Referring now to FIG. 11, shown is a schematic example of the coexistence of NCP and ECP in the same time interval. During a first 0.25 ms time interval, 1100:

URLLC and eMBB traffic with 60 kHz sub-carrier spacing is transmitted with NCP, and eMBB traffic with 30 kHz sub-carrier spacing is transmitted with NCP;

During a second time interval 1102:

eMBB traffic with 60 kHz sub-carrier spacing is transmitted with ECP in region 1104, URLLC traffic with 30 kHz sub-carrier spacing is transmitted with NCP in region 1106, and eMBB traffic with 30 kHz sub-carrier spacing is transmitted with NCP in region 1108.

During the second time interval, separate transmit chains are used for the 60 kHz traffic for eMBB vs. URLLC in regions 1104 and 1106 because different CP types are employed, and some filtering or other suitable form of isolation is required to mitigate interference between the numerologies having different CP types.

The transmitters and receivers described with reference to FIGS. 7A and 7B can be configured to perform CP insertion with simultaneous coexistence of different cyclic prefix. In some embodiments, signaling is employed to inform receivers of the CP used in each sub-frame and for what bandwidth. For example, the default CP might be NCP, and signaling used to indicate when ECP is instead used. As in other embodiments, a different transmit chain 900, 902 is used for each numerology. In particular, a different transmit chain is used for each cyclic prefix type used for the same subcarrier spacing. Thus for the FIG. 11 example, a first transmit chain is used to transmit URLLC region 1106 with 60 kHz sub-carrier spacing and NCP, and a second transmit chain is used to transmit eMBB region 1104 with the same 60 kHz sub-carrier spacing and ECP.

Figure 12:
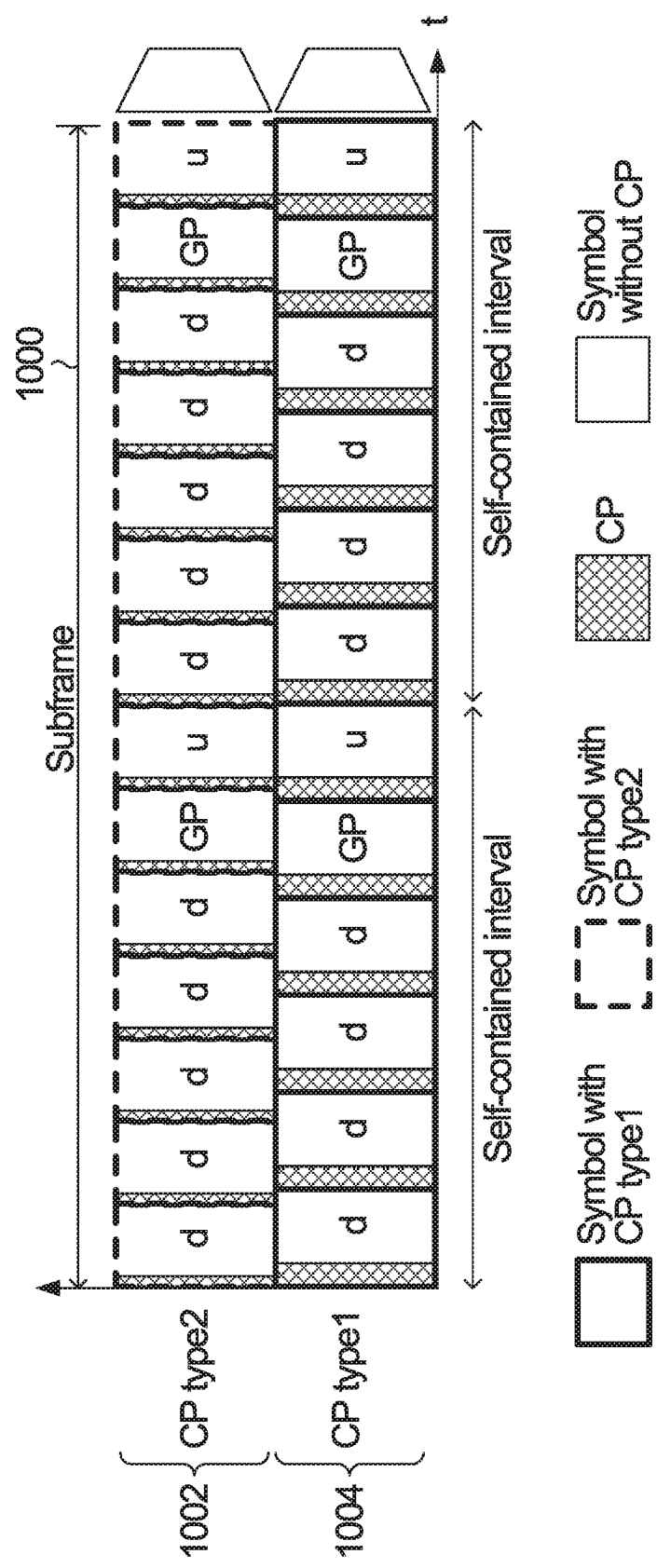
FIG. 12 depicts self-contained sub-frame definitions allowing for simultaneous coexistence of different cyclic prefix types, the two sub-frame definitions having at least partially overlapping guard periods.

FIG. 12 shows the application of the symbol arrangement of FIG. 10 to a self-contained TDD frame structure, where the symbols are used to define self-contained frame structures for CP type 1 (e.g. ECP) and CP type 2 (e.g. NCP) based transmission. As described above, the two traffic types need to be separated by a filter due to non-orthogonal transmission. Some of the symbols are for downlink transmission (labelled d), some are for a guard period labelled (GP), and some are for uplink transmission (labelled u). The DL portion of one CP type does not necessarily align with the DL portion of the other CP type. The two frame structures can be used simultaneously so long as there is at least a partial alignment in the guard periods such that there is no uplink transmission on the frame structure overlapping in time with downlink transmission on the other frame structure, and vice versa. As before, different transmit chains are used to generate the different frame structures. The self-contained TDD frame structures of FIG. 12 can, for example, be used for the coexisting NCP and ECP traffic in regions 1104,1106 of FIG. 11.

Figure 13:
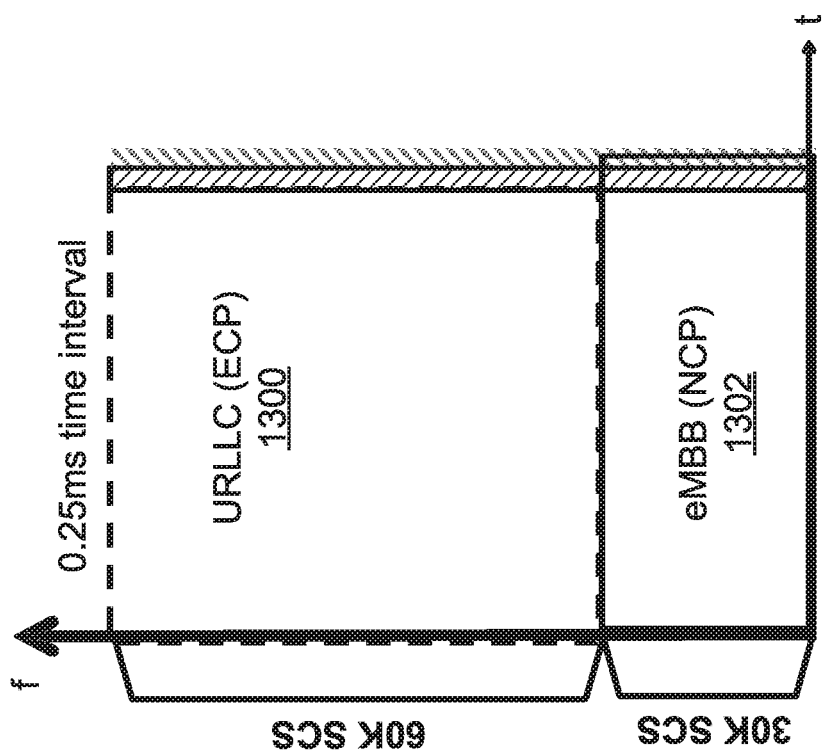
FIG. 13 shows time frequency allocations for URLLC and eMBB where a cyclic prefix type varies within one time period such that different cyclic prefix types are used in the same time interval with different sub-carrier spacings.

In another embodiment, simultaneous type 1 and type 2 cyclic prefixes (e.g. ECP and NCP) are used with different sub-carrier spacings. An example is depicted in FIG. 13. In region 1300, URLLC traffic is transmitted with 60 kHz subcarrier spacing and at the same time, in region 1302, eMBB traffic is transmitted with 30 kHz sub-carrier spacing.

Figure 14:
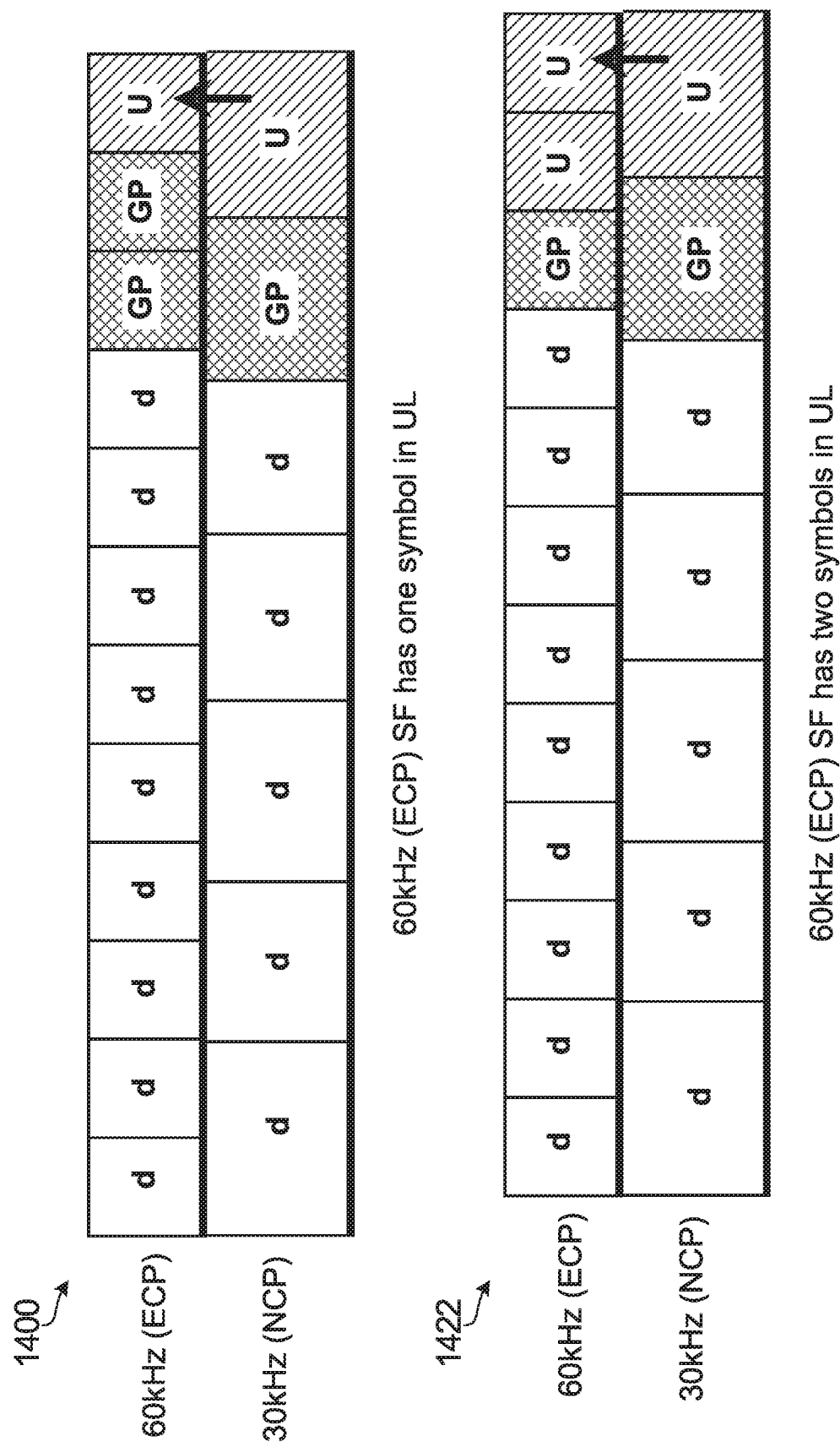
FIG. 14 depicts two examples of self-contained sub-frame definitions allowing for simultaneous coexistence of different cyclic prefix types using different sub-carrier spacings.

FIG. 14 shows two examples of self-contained TDD for transmission simultaneously with type 1 and type 2 cyclic prefixes (e.g. ECP and NCP) with different sub-carrier spacings of 60 kHz and 30 kHz respectively. In both examples, the frame structure includes 12 ECP symbol periods and 7 NCP symbol periods.

In the first example, generally indicated at 1400, the first 9 of the 12 ECP symbols are allocated to downlink transmission, followed by two ECP symbol periods for a guard period, and one ECP symbol for uplink transmission. At the same time, the first 5 of the 7 NCP symbols are allocated to downlink transmission, followed by one NCP symbol period for a guard period, and one NCP symbol for uplink transmission.

In the second example, generally indicated at 1402, the first 9 of the 12 ECP symbols are allocated to downlink transmission, followed by one ECP symbol period for a guard period, and two ECP symbols for uplink transmission. At the same time, the first 5 of the 7 NCP symbols are allocated to downlink transmission, followed by one NCP symbol period for a guard period, and one NCP symbol for uplink transmission.

As shown in the examples of FIG. 14, the guard period symbols do not need to fully align, so long as there is no overlap in time between uplink and downlink transmission.

In some embodiments, one type of traffic is transmitted using a first cyclic prefix type over a scheduling interval that is an aggregation of slots, and traffic of that type is punctured within one or more slots, and in its place, traffic of a different type is transmitted using a different cyclic prefix type. In some embodiments, the traffic of a different type uses the same sub-carrier spacing, and in some embodiments, the traffic of a different type uses a different sub-carrier spacing. Filtering is one approach that can be used to separate signals of different CP types.

A first example is shown in FIG. 15A which shows eMBB traffic with NCP and 30 kHz sub-carrier spacing over an eMBB scheduling interval 1506 which is an aggregation of 3 slots 1500,1502,1504. URLLC traffic with ECP and 60 kHz sub-carrier spacing is transmitted within slot 1502 by puncturing eMBB resources. In this example, the eMBB traffic and the URLLC traffic employ different sub-carrier spacings.

A second example is shown in FIG. 15B which is the same as FIG. 15A, except here the eMBB traffic and the URLLC traffic employ the same sub-carrier spacing of 60 kHz.

Any of the embodiments described herein can be used to implement dynamic resource sharing between eMBB traffic and URLLC traffic. This can be done by puncturing resources scheduled to eMBB, or without puncturing resources scheduled to eMBB, as detailed above.

In some embodiments, scheduling between eMBB and URLLC is independent, for example when at least some eMBB traffic is transmitted in a dedicated sub-band that does not also carry URLLC traffic.

In some embodiments, scalable numerologies are used to serve eMBB UEs depending on the latency requirement of URLLC.

In some embodiments, whether different CP overhead (in accordance with one of the embodiments described above) or the same CP overhead should be applied over a given time interval is configurable by the network. It is possible that both different CP overhead and the same CP overhead are supported at same time in transmissions from different base stations in the network.

Figure 16:
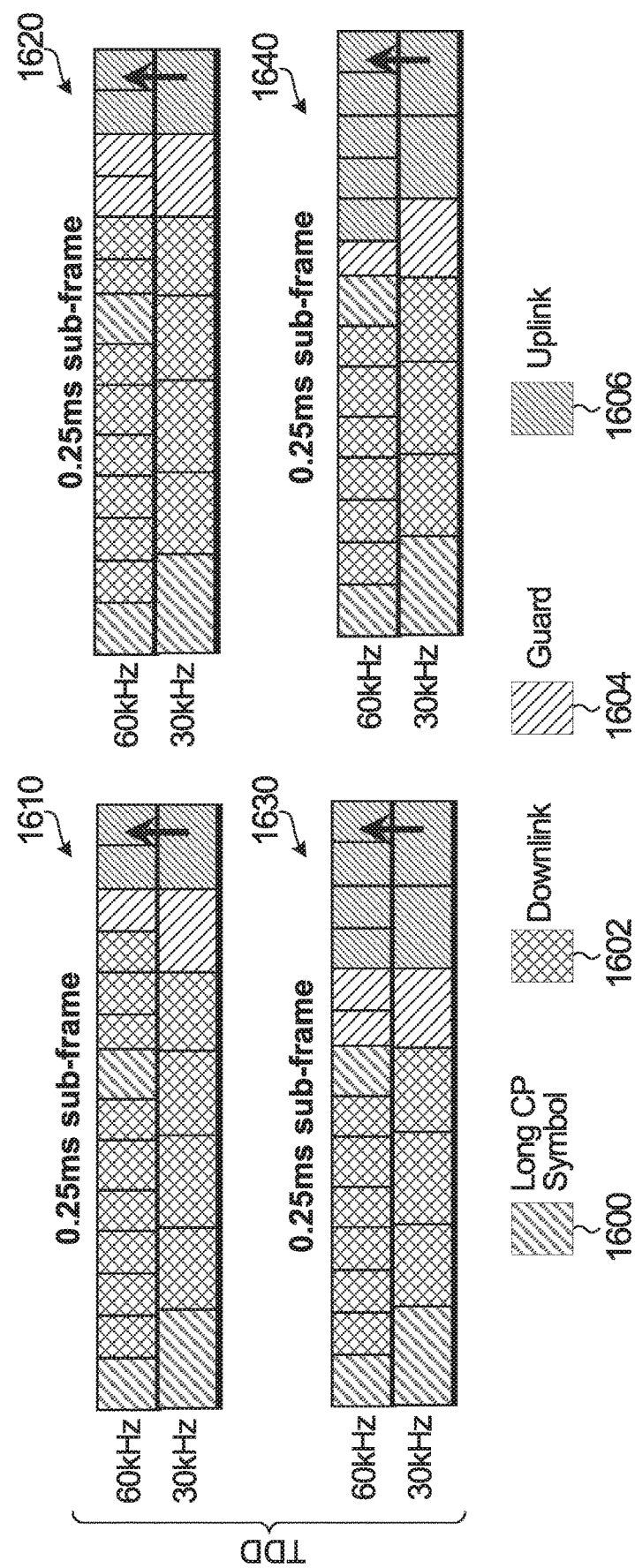
FIG. 16 contains four examples of TDD frame structures for different sub-carrier spacings and the same cyclic prefix overhead.

Specific examples of TDD frame structures using different sub-carrier spacing but the same CP overhead will now be described with reference to FIG. 16. In these examples, where the CP overhead is the same, a 0.25 ms sub-frame with 14 60 kHz symbols aligns with a 0.25 ms sub-frame with 7 30 kHz symbols. A symbol type legend indicates symbols 1600 used for long CP symbols, symbols 1602 for downlink transmission, symbols 1604 for guard period, and symbols 1606 for uplink transmission. In these examples, the last six 60 kHz symbols align with the last three 30 kHz symbols. This is for the case where there are 7 symbols with NCP per sub-frame including 1 with long NCP and 6 with short NCP. For the detailed parameters of the Table of FIG. 8, the short NCP symbols are 2.34 us for 30 kHz sub-carrier spacing, and 1.17 us for 60 kHz sub-carrier spacing. Given the alignment of the 0.25 ms subframe boundaries, according to the Table in FIG. 8, 3*2.34=7.0200=6*1.17. For each of the examples, and the guard periods overlap and are aligned on at least one boundary.

In the first example 1610, the 14 60 kHz symbols are allocated as follows:
Symbols 1 and 8: long CP symbols;
Symbols 2 to 7 and 9 to 11: downlink;
Symbol 12: guard period;
Symbols 13 and 14: uplink;
and the 7 30 kHz symbols are allocated as follows:
Symbol 1: pilot symbol;
Symbols 2 to 5: downlink;
Symbol 6: guard period;
Symbol 7: uplink.

The second example 1620 differs from the first example 1610 in that the 11$^{th}$ 60 kHz symbol is a guard period instead of a downlink symbol.

In the third example 1630, the 14 60 kHz symbols are allocated as follows:
Symbols 1 and 8: long CP symbols;
Symbols 2 to 7: downlink;
Symbol 9, 10: guard period;
Symbols 11 to 14: uplink;
and the 7 30 kHz symbols are allocated as follows:
Symbol 1: pilot symbol;
Symbols 2 to 4: downlink;
Symbol 5: guard period;
Symbols 6 and 7: uplink.

The fourth example 1640 differs from the third example 1630 in that the 10$^{th}$ 60 kHz symbol is a downlink symbol instead of a guard period.

Figure 17A:
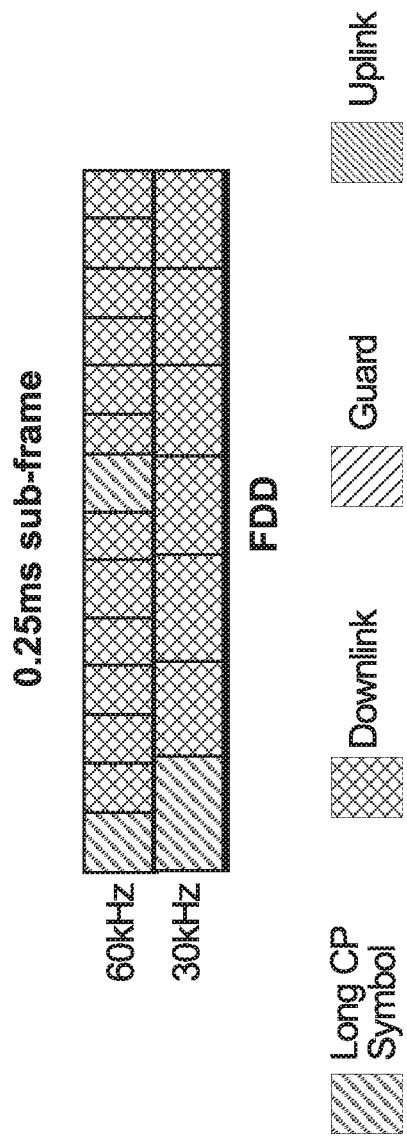
FIG. 17A is an example of a FDD frame structure for different sub-carrier spacings and the same cyclic prefix overhead.

FIG. 17A shows an FDD example showing downlink transmission only. With this example, the 14 60 kHz symbols are allocated as follows:
Symbols 1 and 8: long CP symbols;
Symbols 2 to 7 and 9 to 14: downlink;
and the 7 30 kHz symbols are allocated as follows:
Symbol 1: pilot symbol;
Symbols 2 to 7: downlink.

Figure 17B:
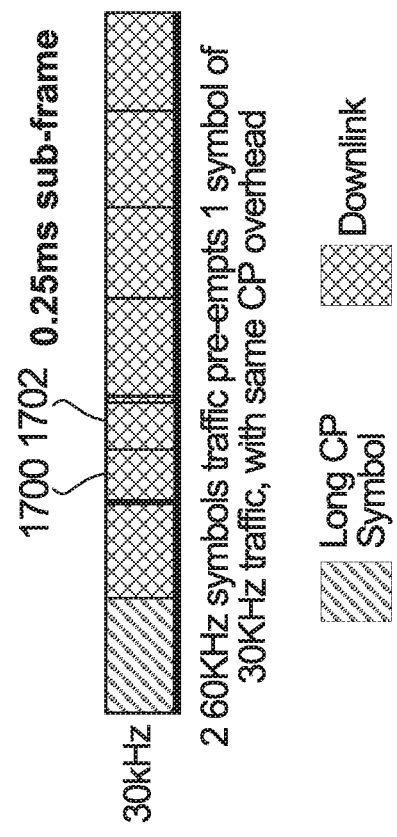
FIG. 17B is an example of a FDD frame structure for a first sub-carrier spacing, where symbols of a second sub-carrier spacing and the same cyclic prefix overhead pre-empt one or more of the symbols for the first sub-carrier spacing.

In some embodiments, where the same pilot overhead is employed, traffic with one sub-carrier spacing can pre-empt traffic of another sub-carrier spacing. A specific example is shown in FIG. 17B which shows at 0.25 ms sub-frame with 7 symbol periods for transmitting with 30 kHz sub-carrier spacing. As illustrated, 2 60 kHz symbols 1700,1702 pre-empt one symbol of 30 kHz traffic with the same CP overhead.

Figure 18:
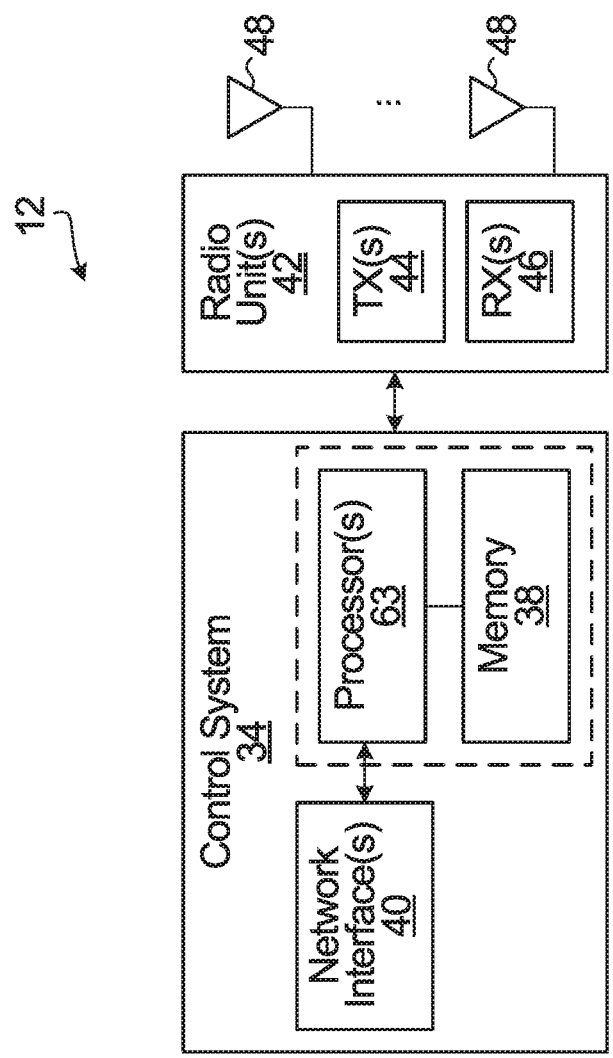
FIG. 18 is a block diagram of a base station.

FIG. 18 is a schematic block diagram of a BS 12 according to some embodiments of the present disclosure. As illustrated, the BS 12 includes a control system 34 configured to perform the base station functions described herein. In some implementations, the control system 34 is in the form of circuitry configured to perform the access node functions. In yet other implementations, the control system or circuitry 34 includes one or more processors 36 (e.g., CPUs, ASICs, FPGAs, and/or the like) and memory 38 and optionally a network interface 40. The BS 12 also includes one or more radio units 42 that each includes one or more transmitters 44 and one or more receivers 46 coupled to one or more antennas 48. In some other implementations, the functionality of the BS 12 described herein may be fully or partially implemented in software or modules that is, e.g., stored in the memory 38 and executed by the processor(s) 36.

In yet other implementations, a computer program including instructions which, when executed by at least one processor, causes the at least one processor to carry out the functionality of the BS 12 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 19:
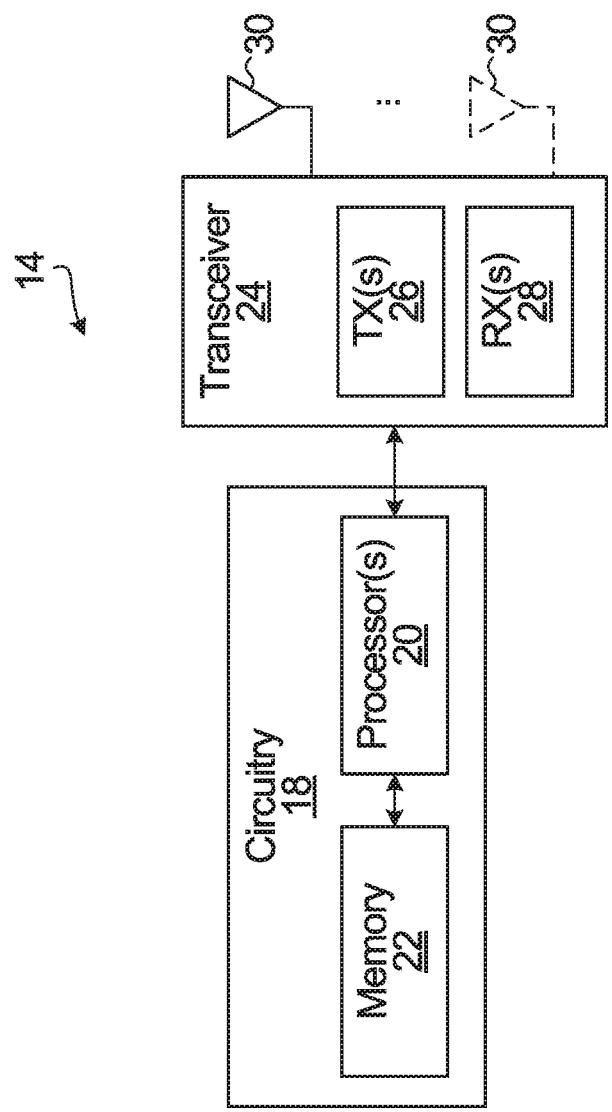
FIG. 19 is a block diagram of a wireless device.

FIG. 19 is a schematic block diagram of the wireless device 14 according to some embodiments of the present disclosure. As illustrated, the wireless device 14 includes circuitry 18 configured to perform the wireless device functions described herein. In some implementations, the circuitry 18 includes one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some other implementations, the functionality of the wireless device 14 described herein may be fully or partially implemented in software or modules that is, e.g., stored in the memory 22 and executed by the processor(s) 20.

In yet other implementations, a computer program including instructions which, when executed by at least one processor, causes the at least one processor to carry out the functionality of the wireless device 14 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 20:
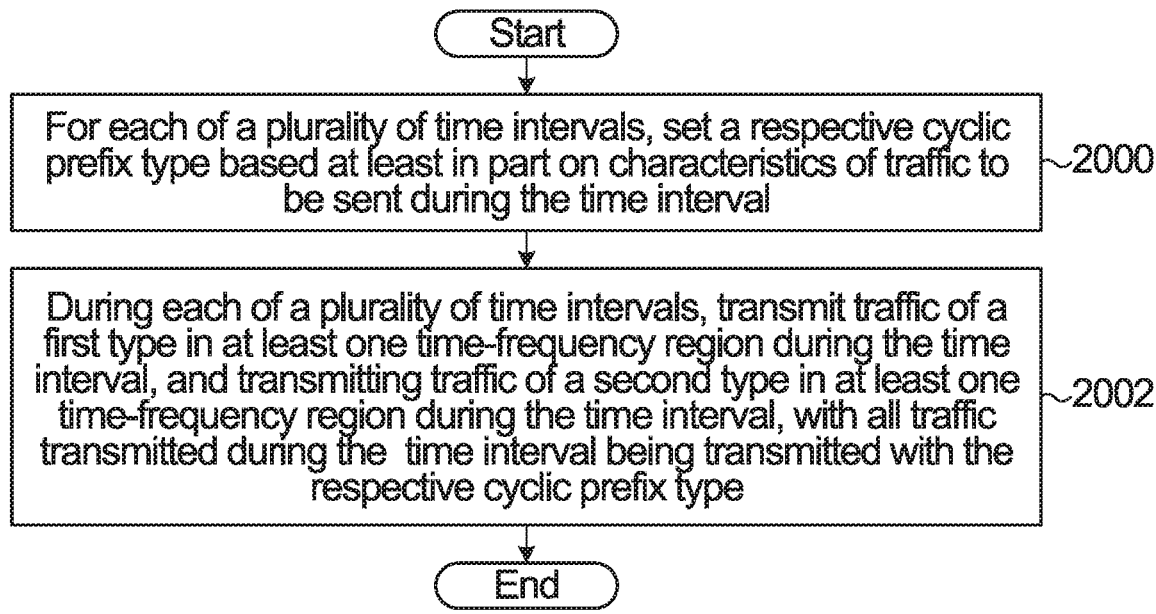
FIGS. 20 and 21 are flowcharts of methods provided by embodiments of the invention.

FIG. 20 is a flowchart of a method provided by an embodiment of the invention. The method begins in block 2000 with, for each of a plurality of time intervals, setting a respective cyclic prefix type based at least in part on characteristics of traffic to be sent during the time interval. The method continues in block 2002 with, during each of a plurality of time intervals, transmitting traffic of a first type in at least one time-frequency region during the time interval, and transmitting traffic of a second type in at least one time-frequency region during the time interval, with all traffic transmitted during the time interval being transmitted with the respective cyclic prefix type.

Figure 21:
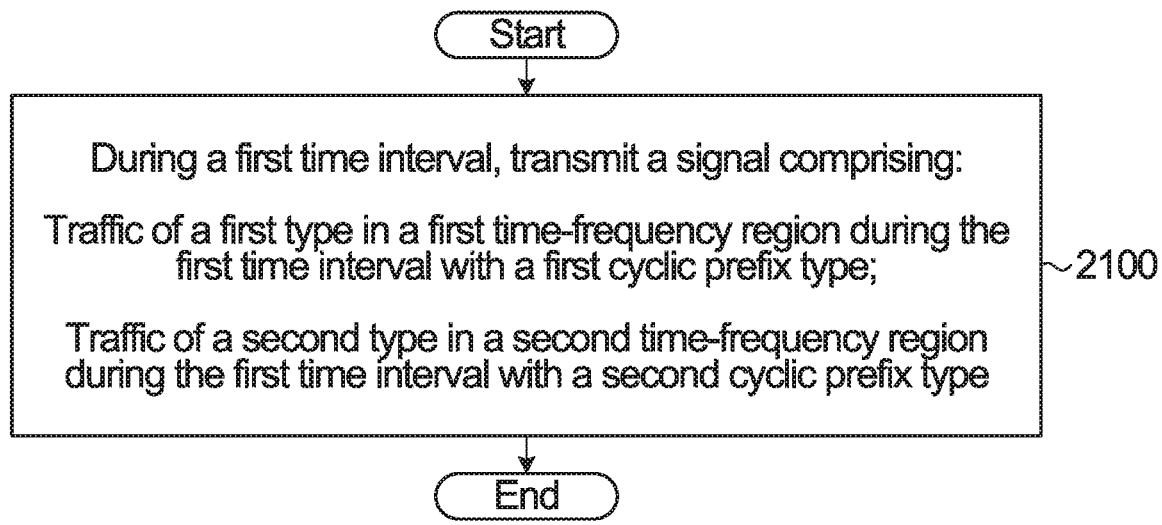

FIG. 21 is a flowchart of a method provided by an embodiment of the invention. The method involves, in block 2100, during a first time interval, transmitting a signal comprising:

traffic of a first type in a first time-frequency region during the first time interval with a first cyclic prefix type;

traffic of a second type in a second time-frequency region during the first time interval with a second cyclic prefix type.

Optionally, for any of the described embodiments, each UE provides an indication message to the network, for example an initial indication message at the time of admission to a serving gNodeB (gNB), indicating its support for one or more cyclic prefix types. This may include an indication of support for one or more cyclic prefix types for each supported sub-carrier spacing. In some embodiments, this indication can also be requested by the network, for example using higher layer signaling from a gNB.

Figure 22A:
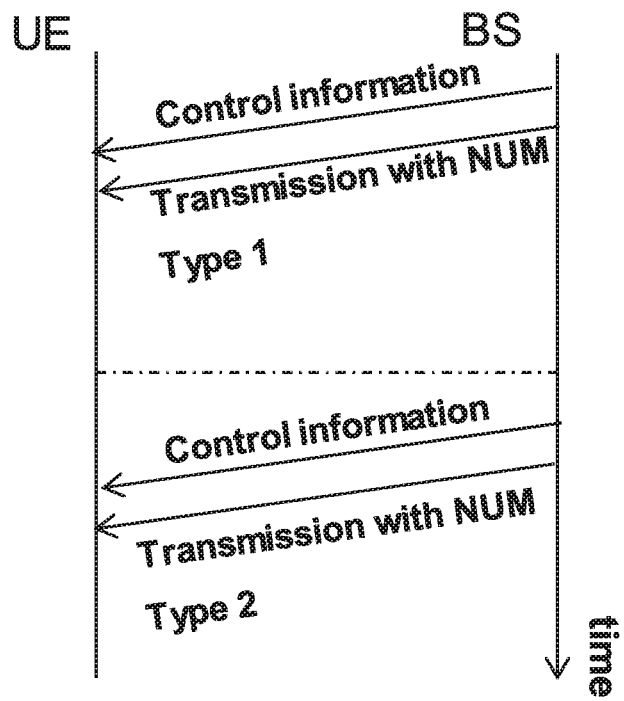
FIGS. 22A and 22B are examples of the use of control information to signal change in numerology or CP type.

Optionally, for any of the described embodiments, a given UE can support different numerologies. In a first example, from one interval to another, the numerology type can change. The network (for example a gNB) can notify the UE of the numerology update via control information. An example of this is depicted in FIG. 22A.

Figure 22B:
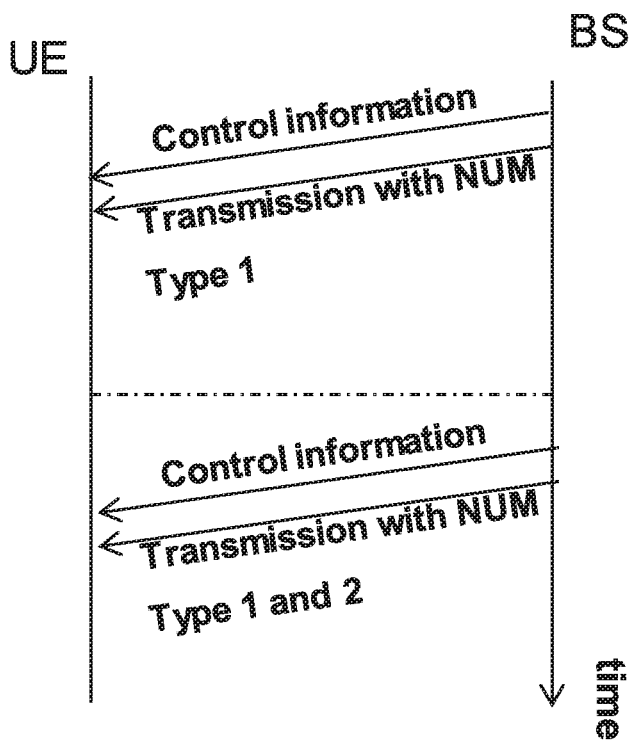

In a second example, a given UE is capable of simultaneously receiving transmissions over different numerologies. An example is depicted in FIG. 22B. In this example, over one time interval, a UE receives data with NUM type 1, and in another following interval, the UE receives two different traffic types. One traffic type is received with NUM type 1 and another traffic type is received with NUM type 2. The two traffic types are received in different sub-bands.

Optionally, for any of the described embodiments, signaling is used to convey an indication of CP type change to a UE. The indication can be in the downlink control information (DCI) in a UE specific region. Alternatively, the indication can be in a common region, for example a physical downlink control channel (PDCCH), that might, for example, be cell specific or UE-group based.

Optionally, for any of the described embodiments, there is a pre-configured CP type which can be updated based on signaling that is sent in a location other than the PDCCH. This location may be configured or on-demand. For example a CP type change in an uplink transmission may be signaled in an uplink grant or other common region in the PDCCH containing uplink transmission parameters. In some embodiments, the network (for example a gNB) may dynamically puncture DL data to send notification of a CP type update.

Systems and methods of transmitting using different cyclic prefix types have been described. In some embodiments, the cyclic prefix type changes on a per time interval basis, based on characteristics of the traffic in a particular time interval. In some embodiments, different cyclic prefix types are used simultaneously during a time interval for different traffic types. In some embodiments, both of these approaches are combined, with one approach used during some time slots, and the other approach used during some time slots.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
during a first time interval, transmitting a signal including a first traffic in a first time-frequency region of the first time interval with a first cyclic prefix and a second traffic in a second time-frequency region of the first time interval with a second cyclic prefix, a length of the first cyclic prefix in the first traffic being different than a length of the second cyclic prefix in the second traffic, the first traffic sent over a downlink portion of a first self-contained sub-frame that includes a downlink portion, a guard period, and an uplink portion, the second traffic sent over a downlink portion of a second self-contained sub-frame that includes a downlink portion, a guard period, and an uplink portion, the second self-contained sub-frame being different than the first self-contained sub-frame,
wherein the guard period of the first self-contained sub-frame is at least partially aligned with the guard period of the second self-contained sub-frame such that the uplink portion of the first self-contained sub-frame does not overlap in the time-domain with the downlink portion of the second self-contained sub-frame.

2. The method of claim 1, wherein the first traffic is sent with a sub-carrier spacing that is the same as that for the second traffic.

3. The method of claim 1, wherein the first traffic is sent with a sub-carrier spacing that is different from that for the second traffic.

4. The method of claim 1, further comprising:
setting the length of the first cyclic prefix in the first traffic and the length of the second cyclic prefix in the second traffic based at least in part on characteristics of the first traffic and the second traffic, respectively.

5. The method of claim 4, wherein the length of the first cyclic prefix in the first traffic and the length of the second cyclic prefix in the second traffic is based on at least one of:
modulation and coding schemes used for the first traffic and the second traffic, respectively;
payloads of the first traffic and the second traffic, respectively; and
bandwidth allocated to the first traffic and the second traffic, respectively.

6. The method of claim 4, wherein the first traffic is ultra-reliable low latency communications (URLLC) traffic and the second traffic is enhanced mobile broadband (eMBB) traffic.

7. The method of claim 4, wherein each cyclic prefix is one of normal cyclic prefix (NCP) and ECP (extended cyclic prefix).

8. The method of claim 1, wherein transmitting the signal during the first time interval comprises:
   transmitting, during at least part of the first time interval, traffic of multiple different traffic types, inclusive of the first traffic, all of which having the same length cyclic prefix as the first traffic; and
   transmitting, during at least part of the first time interval, traffic of multiple different traffic types, inclusive of the second traffic, all of which having the same length cyclic prefix as the second traffic.

9. The method of claim 8, wherein the first traffic is sent with a sub-carrier spacing that is the same as that for the second traffic.

10. The method of claim 8, wherein the first traffic is sent with a sub-carrier spacing that is different from that for the second traffic.

11. A method comprising:
   receiving, by a user equipment (UE), first traffic within a first time-frequency region using a first cyclic prefix type and/or first sub-carrier spacing, wherein the first time-frequency region at least partially overlaps in an area of overlap with a second time-frequency region originally scheduled for second traffic using a second cyclic prefix type and/or second sub-carrier spacing, and traffic within the second time-frequency region is punctured in the area of overlap between the first time-frequency region and the second time-frequency region; and
   at a time after transmission of scheduling information in respect of the second traffic within the second time frequency region, receiving an indication of the first traffic within the first time-frequency region.

12. The method of claim 11, wherein the first traffic is ultra-reliable low latency communications (URLLC) traffic and the second traffic is enhanced mobile broadband (eMBB) traffic.

13. The method of claim 11, wherein each cyclic prefix type is one of normal cyclic prefix (NCP) and ECP (extended cyclic prefix).

14. The method of claim 11 further comprising:
   transmitting an indication message to a network indicating support by the UE for one or more cyclic prefix lengths for each of at least one supported sub-carrier spacing.

15. A user equipment (UE) comprising:
   at least one receive chain, each receive chain comprising a sub-carrier de-mapper, an FFT, and a pilot symbol and cyclic prefix processor, each receive chain operating with a respective sub-carrier spacing and a respective cyclic prefix type;
   the UE configured to receive first traffic within a first time-frequency region using a first cyclic prefix type and/or first sub-carrier spacing, wherein the first time-frequency region overlaps in an area of overlap with a second time-frequency region originally scheduled for second traffic using a second cyclic prefix type and/or second sub-carrier spacing, and traffic within the second time-frequency region is punctured in the area of overlap between the first time-frequency region and the second time-frequency region; and
   the UE further configured to receive, at a time after transmission of scheduling information in respect of the second traffic within the second time frequency region, an indication of the first traffic within the first time-frequency region.

16. The UE of claim 15, wherein the first traffic is ultra-reliable low latency communications (URLLC) traffic and the second traffic is enhanced mobile broadband (eMBB) traffic.

17. The UE of claim 15, wherein each cyclic prefix type is one of normal cyclic prefix (NCP) and ECP (extended cyclic prefix).

18. The UE of claim 15, the UE further configured to transmit an indication message to a network indicating support by the UE for one or more cyclic prefix lengths for each of at least one supported sub-carrier spacing.

19. A base station comprising:
   at least two transmit chains, each transmit chain comprising a sub-carrier mapper and grouper, an IFFT, and a pilot symbol and cyclic prefix inserter, each transmit chain operating with a respective sub-carrier spacing and a respective cyclic prefix length, first transmit chain of the at least two transmit chains configured to transmit, during a first time interval, first traffic in a first time-frequency region over a downlink portion of a first self-contained sub-frame that includes a downlink portion, a guard period and an uplink portion, a second transmit chain of the at least two transmit chains configured to transmit, during the first time interval, second traffic in a second time-frequency region over a downlink portion of a second self-contained sub-frame that includes a downlink portion, a guard period and an uplink portion, the second self-contained sub-frame being different than the first self-contained sub-frame, a length of a first cyclic prefix in the first traffic being different than a length of a second cyclic prefix in the second traffic,
   wherein the guard period of the first self-contained sub-frame is at least partially aligned with the guard period of the second self-contained sub-frame such that the uplink portion of the first self-contained sub-frame does not overlap in the time-domain with the downlink portion of the second self-contained sub-frame.

20. The base station of claim 19, wherein the first transmit chain further operates to transmit, during at least part of the first time interval, traffic of multiple different traffic types, inclusive of the first traffic, all of which having the same length cyclic prefix as the first traffic, and
   wherein the second transmit chain further operates to transmit, during at least part of the first time interval, traffic of multiple different traffic types, inclusive of the second traffic, all of which having the same length cyclic prefix as the second traffic.

21. The base station of claim 20, wherein the first transmit chain operates with a sub-carrier spacing that is the same as that of the second transmit chain.

22. The base station of claim 20, wherein the first transmit chain operates with a sub-carrier different from that of the second transmit chain.

* * * * *